(12) United States Patent
Mortensen

(10) Patent No.: US 12,321,593 B2
(45) Date of Patent: Jun. 3, 2025

(54) REGULAR EXPRESSION FILTER FOR UNICODE TRANSFORMATION FORMAT STRINGS

(71) Applicant: Sandisk Technologies, Inc., Milpitas, CA (US)

(72) Inventor: Mikael Mortensen, Milpitas, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/486,310

(22) Filed: Sep. 27, 2021

(65) Prior Publication Data

US 2023/0102410 A1    Mar. 30, 2023

(51) Int. Cl.
*G06F 3/06* (2006.01)

(52) U.S. Cl.
CPC .......... *G06F 3/0608* (2013.01); *G06F 3/0655* (2013.01); *G06F 3/0679* (2013.01)

(58) Field of Classification Search
CPC ..... G06F 3/0608; G06F 3/0679; G06F 3/0661
USPC ....................................................... 711/154
See application file for complete search history.

(56) References Cited

U.S. PATENT DOCUMENTS

| | | | |
|---|---|---|---|
| 6,272,497 B1 | 8/2001 | Mendenhall et al. | |
| 7,206,831 B1* | 4/2007 | Dube | H04L 43/00 712/228 |
| 7,433,877 B2 | 10/2008 | Chen et al. | |
| 8,051,085 B1 | 11/2011 | Srinivasan et al. | |
| 8,819,045 B2 | 8/2014 | Dhulipala et al. | |
| 2003/0112904 A1 | 6/2003 | Fuller et al. | |
| 2003/0194012 A1* | 10/2003 | Sakai | H03M 7/425 375/240.23 |
| 2004/0044791 A1* | 3/2004 | Pouzzner | G06F 16/9566 707/E17.115 |
| 2006/0112157 A1 | 5/2006 | Song | |
| 2009/0141566 A1 | 6/2009 | Arsovski | |
| 2009/0210412 A1* | 8/2009 | Oliver | G06F 16/3338 707/999.005 |
| 2010/0088315 A1 | 4/2010 | Netz et al. | |
| 2011/0040771 A1 | 2/2011 | Gilyadov et al. | |
| 2013/0166554 A1 | 6/2013 | Yoon et al. | |
| 2013/0346428 A1 | 12/2013 | Viehland et al. | |
| 2014/0052743 A1 | 2/2014 | Schauer et al. | |
| 2015/0006857 A1* | 1/2015 | Kuo | G06F 9/30018 712/208 |

(Continued)

FOREIGN PATENT DOCUMENTS

| | | | |
|---|---|---|---|
| KR | 1020100106402 A | 10/2010 | |
| KR | 10202010014746 A | 2/2021 | |

OTHER PUBLICATIONS

U.S. Appl. No. 17/717,533, filed Apr. 11, 2022.

(Continued)

*Primary Examiner* — Hashem Farrokh

(74) *Attorney, Agent, or Firm* — Vierra Magen Marcus LLP

(57) ABSTRACT

An apparatus is provided that includes a memory system that has a memory die that includes a circuit configured to receive at a first input terminal a plurality of bytes comprising an input stream of a first plurality of variable-length encoded symbols, and determine a sequence of symbol byte lengths for each of the first plurality of variable-length encoded symbols.

18 Claims, 24 Drawing Sheets

(56) References Cited

U.S. PATENT DOCUMENTS

| | | | |
|---|---|---|---|
| 2015/0109153 A1* | 4/2015 | Wu | H03M 7/4031 |
| | | | 341/65 |
| 2015/0169655 A1 | 6/2015 | Gupta | |
| 2016/0055208 A1 | 2/2016 | Beavin et al. | |
| 2016/0350385 A1 | 12/2016 | Poder et al. | |
| 2017/0185647 A1 | 6/2017 | Billington et al. | |
| 2020/0295779 A1* | 9/2020 | Ki | G06F 3/064 |

OTHER PUBLICATIONS

Palkar et al., "Filter Before Your Parse: Faster Analytics on Raw Data with Sparser", Proceedings of the VLDB Endowment, vol. 11, No. 11, Aug. 2018.

Gagolewski, "stringi: Fast and Portable Character String Processing in R", Sep. 17, 2020, https://stringi.gagolewski.com.

Shin et al., "Regular Expression Filtering on Multiple q-Grams", IEICE Transf. Inf. & Syst., vol. E101-D, No. 1, Jan. 2018.

Office Action dated May 10, 2023 in U.S. Appl. No. 17/717,533, filed Apr. 11, 2022.

Response to Office Action dated Jun. 25, 2023 in U.S. Appl. No. 17/717,533, filed Apr. 11, 2022.

* cited by examiner

Symbol stream: 😀 Ẋ § @

UTF-8 Byte stream: 11110000100111111110000000010011001111100001001100011101001010011101000000

$B_0$ $B_1$ $B_2$ $B_3$ $B_4$ $B_5$ $B_6$ $B_7$ $B_8$ $B_9$

| Byte | Bits | 502a [7] = 0 | 502b [7:5] = 110 | 502c [7:4] = 1110 | 502d [7:3] = 11110 | 502e [7:6] = 10 | BLV | EBLV |
|---|---|---|---|---|---|---|---|---|
| $B_0$ | 11110000 | 0 | 0 | 0 | 1 | 0 | 4 | 011 |
| $B_1$ | 10011111 | 0 | 0 | 0 | 0 | 1 | S | 100 |
| $B_2$ | 10000000 | 0 | 0 | 0 | 0 | 1 | S | 100 |
| $B_3$ | 10011001 | 0 | 0 | 1 | 0 | 1 | S | 100 |
| $B_4$ | 11100001 | 0 | 0 | 0 | 0 | 0 | 3 | 010 |
| $B_5$ | 10111010 | 0 | 0 | 0 | 0 | 1 | S | 100 |
| $B_6$ | 10001010 | 0 | 1 | 0 | 0 | 0 | S | 100 |
| $B_7$ | 11000010 | 0 | 0 | 0 | 0 | 1 | 2 | 001 |
| $B_8$ | 10100111 | 0 | 0 | 0 | 0 | 1 | S | 100 |
| $B_9$ | 01000000 | 1 | 0 | 0 | 0 | 0 | 1 | 000 |

BLV: [4] [S] [S] [S] [3] [S] [S] [2] [S] [1]

SBL: [4] [3] [2] [1]

FIG. 6

| Byte | B₀ | B₁ | B₂ | B₃ | B₄ | B₅ | B₆ | B₇ | B₈ | B₉ | B₁₀ |
|---|---|---|---|---|---|---|---|---|---|---|---|
| BLV: | | | | | | | | | | | |
| (0) ODD | 4 | S | S | S | 3 | S | S | 2 | S | 1 | S |
| | | | | | swap | | | swap | | swap | |
| (1) EVEN | 4 | S | S | S | 3 | S | 2 | S | 1 | S | S |
| | | | swap | | | swap | | swap | | | |
| (2) ODD | 4 | S | S | 3 | S | 2 | S | 1 | S | S | S |
| | | swap | | swap | | swap | | | | | |
| (3) EVEN | 4 | S | 3 | S | 2 | S | 1 | S | S | S | S |
| | | swap | | swap | | swap | | | | | |
| (4) ODD | 4 | 3 | S | 2 | S | 1 | S | S | S | S | S |
| | | | swap | | swap | | | | | | |
| (5) EVEN | 4 | 3 | 2 | S | 1 | S | S | S | S | S | S |
| SBL: | | | | | | | | | | | |

FIG. 7

Symbol stream: 🌀 Ẋ § @

UTF-16 Word stream: 1101100000111110011011101111000011111001010000010100000111100000000001000000

$W_0$ $W_1$ $W_2$ $W_3$ $W_4$

| Word | Bits | 1002a [15:10] = 110111 | 1002b [15:10] = 110110 | BLV | EBLV |
|---|---|---|---|---|---|
| $W_0$ | 11011000 00111100 | 0 | 1 | 4 | 001 |
| $W_1$ | 11011100 00011001 | 1 | 0 | S | 100 |
| $W_2$ | 00011110 10001010 | 0 | 0 | 2 | 000 |
| $W_3$ | 00000000 00111100 | 0 | 0 | 2 | 000 |
| $W_4$ | 00000000 01000000 | 0 | 0 | 2 | 000 |

BLV: [4] [S] [2] [2] [2]

SBL: [4] [2] [2] [2] [2]

FIG. 11

UTF-8/16 example with UTF-8 encoded symbols

Symbol stream: 🎯 Ẋ § @

UTF-8 Word stream: 1111000010011111100000001001100111100001101110100001101010100011100101000000

|       |                   | W0 |        | W1     |        | W2    |      |       | W3  |       |        |        | W4    |      |       |
|-------|-------------------|------|--------|--------|--------|-------|------|-------|-----|-------|--------|--------|-------|------|-------|
|       |                   | 1310a | 1310c | 1310d | 1310f | 1310h |      |       | 1310i | 1310j | 1310k | 1310l | 1310m |      |       |
| Word  | Bits              | [15]=0 | [15:13]=110 | [15:12]=1110 | [15:11]=11110 | [15:14]=10 | BLVH | EBLVH | [7]=0 | [7:5]=110 | [7:4]=1110 | [7:3]=11110 | [7:6]=10 | BLVL | EBLVL |
| $W_0$ | 11110000 10011111 | 0 | 0 | 0 | 1 | 0 | 4 | 011 | 0 | 0 | 0 | 1 | 1 | S | 100 |
| $W_1$ | 10000000 10011001 | 0 | 0 | 0 | 0 | 1 | S | 100 | 0 | 0 | 0 | 0 | 1 | S | 100 |
| $W_2$ | 11100001 10111010 | 0 | 0 | 1 | 0 | 0 | 3 | 010 | 0 | 0 | 0 | 0 | 1 | S | 100 |
| $W_3$ | 10001010 11000010 | 0 | 0 | 0 | 0 | 1 | S | 100 | 1 | 1 | 0 | 0 | 0 | 2 | 001 |
| $W_4$ | 10100111 01000000 | 0 | 0 | 0 | 0 | 0 | S | 100 | 0 | 0 | 0 | 0 | 0 | 1 | 000 |

BLV: [4] [S] [S] [3] [S] [S] [S] [2] [S] [1]

SBL: [4] [3] [2] [1]

FIG. 14A

UTF-8/16 example with UTF-16 encoded symbols

Symbol stream: 🔘 Ẋ § @

UTF-16 Word stream: 1101100000111100 1101110000000100 0000111010001010 0000000000111100 0000000001000000

W0 | W1 | W2 | W3 | W4

| Word | Bits | 1310b [15:10] != 110110 & != 110111 | 1310e [15:10] = 110110 | 1310g [15:10] = 110111 | BLVH | EBLVH |
|---|---|---|---|---|---|---|
| $W_0$ | 11011000 00111100 | 0 | 1 | 0 | 4 | 011 |
| $W_1$ | 11011100 00000100 | 0 | 0 | 1 | S | 100 |
| $W_2$ | 00001110 10001010 | 1 | 0 | 0 | 2 | 001 |
| $W_3$ | 00000000 00111100 | 1 | 0 | 0 | 2 | 001 |
| $W_4$ | 00000000 01000000 | 1 | 0 | 0 | 2 | 001 |

BLV: [4] [S] [2] [2] [2]

SBL: [4] [2] [2] [2] [2]

FIG. 14B

REGULAR EXPRESSION FILTER FOR UNICODE TRANSFORMATION FORMAT STRINGS

BACKGROUND

A host device coupled to a memory system, such as a solid state drive (SSD), may execute software applications that search data stored on the SSD. Regular expressions are often used to perform such searches. A regular expression is a sequence of symbols that forms a search pattern in string matching. For example, regular expressions may be used to search for all files, documents, directories, or other similar data objects on the SSD that include a particular word or phrase.

Conventionally, such regular expression matching is performed on the host device. In particular, the host device reads data to be searched from the SSD, and then the host device executes various functions to determine if any retrieved data match the regular expression search pattern. Although such techniques achieve the desired result, transferring large quantities of data between the SSD and the host device to perform regular expression matching is inefficient and time consuming.

One possibility to improve speed and efficiency of regular expression matching is to implement a regular expression filter in hardware on the memory device to reduce the amount of data transferred from the memory device to the host device. A hardware regular expression filter does not perform a complete regular expression matching operation. Instead, a regular expression filter typically searches for strings that match a first few symbols (sometimes referred to as a "trigger") of the regular expression search pattern to identify relevant strings that may match the entire regular expression search pattern.

The filtered data, which only includes the identified relevant strings, may then be transferred to a processor (e.g., on the host device) to perform the remaining regular expression matching in software. In this regard, the hardware regular expression filter may reduce the amount of data that must be transferred between the memory device and the host device for regular expression matching.

Existing hardware regular expression filters are primarily used for network package filtering, and are aimed at high bandwidth and a large number of parallel expressions. Because almost all network traffic is ASCII encoded, existing hardware regular expression filters typically operate on ASCII data, in which each symbol is encoded in a single byte. A hardware regular expression filter for such fixed-length encoding schemes is straightforward to implement. For example, if an input string includes N one-byte symbols, a hardware regular expression filter may simply operate N parallel comparators that each operate on N separate bytes of the input string.

In contrast, text data (such as in documents and web pages) are typically encoded using a variable-length encoding scheme, such as a Unicode Transformation Format (UTF) encoding scheme. The most commonly used variable-length encoding schemes are UTF-8 and UTF-16. UTF-8 encodes symbols using one to four byte code units, and UTF-16 encodes symbols using one or two word code units (that is, two bytes or four bytes). Designing a hardware regular expression filter for such variable-length encoded data is thus more complicated than for ASCII encoded data. Indeed, if an input string includes N symbols, each of which may be encoded in one to four bytes, a hardware regular expression filter cannot simply operate N parallel comparators that each operate on N separate bytes of the input string.

In addition to the complexity resulting from variable-length encoding, UTF has quite a few variants for data representation, and can be either "big-endian" or "little-endian" encoded. Moreover, UTF has four different methods of graph encoding: Normalization Form Canonical Decomposition (NFD), Normalization Form Canonical Composition (NFC), Normalization Form Compatibility Decomposition (NFKD), and Normalization Form Compatibility Composition (NFKC). Also, there are localized variants of Unicode, like Chinese GB 18030. Because of this complexity, designing a hardware regular expression filter that can be used with all variants of a variable-length encoding scheme such as Unicode and that can correctly interpret the data is quite difficult.

BRIEF DESCRIPTION OF THE DRAWINGS

Like-numbered elements refer to common components in the different figures.

FIG. 6 is a diagram depicting an example byte stream of UTF-8 encoded symbols.

FIG. 7 is a diagram of an embodiment of a technique for filtering S byte length values from the stream of byte length values.

FIG. 11 is a diagram depicting an example word stream of UTF-16 encoded symbols.

FIG. 14A is a diagram depicting an example word stream of UTF-8 encoded symbols.

FIG. 14B is a diagram depicting an example word stream of UTF-16 encoded symbols.

DETAILED DESCRIPTION

Figure 1:
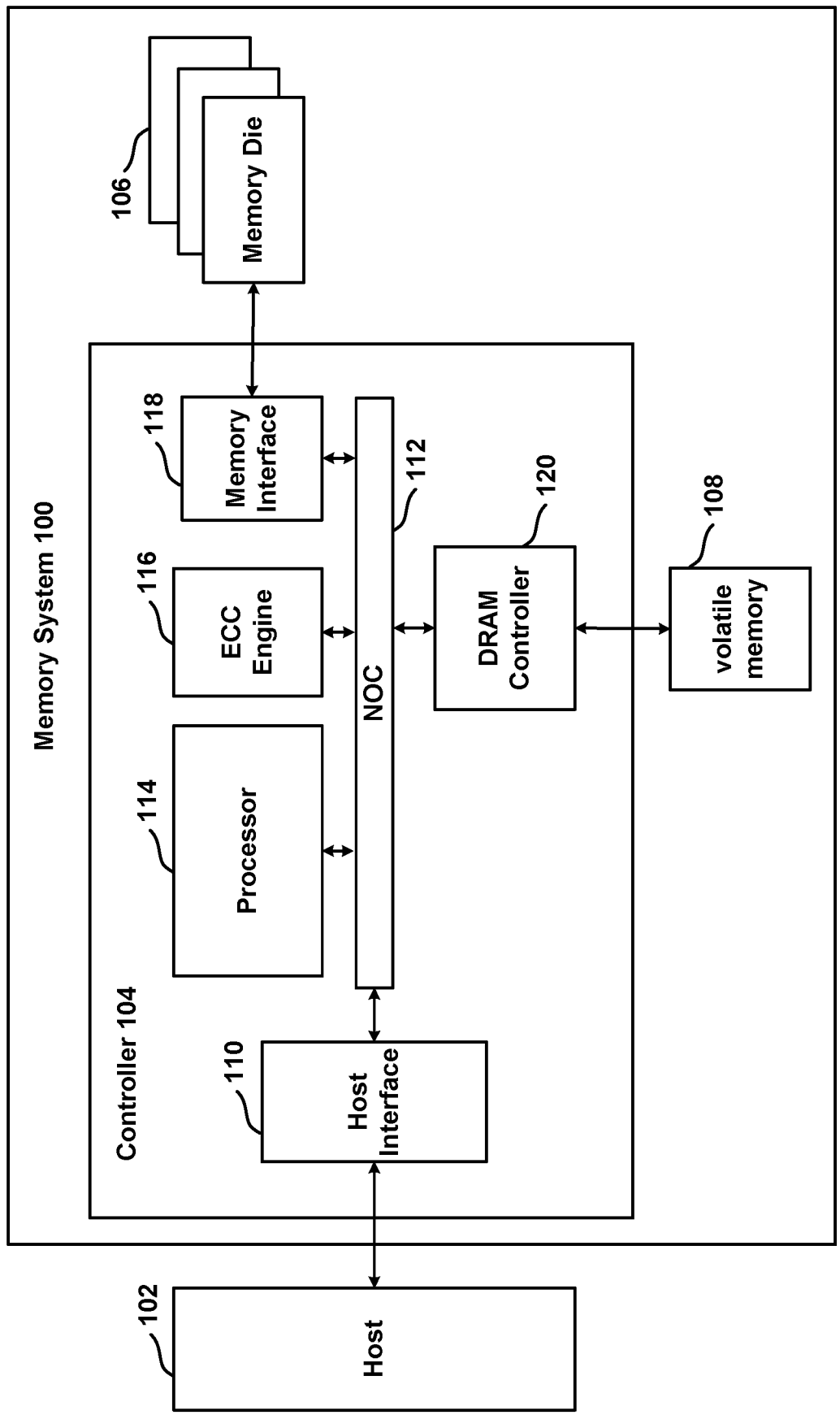
FIG. 1 is a block diagram depicting one embodiment of a memory system.

Technology is described for hardware regular expression filters that can be used with all variants of a variable-length encoding scheme such as Unicode and that can correctly interpret the data. In embodiments, hardware regular expression filters are described that do not determine the actual symbols or the composition of the encoded symbols in an input stream. In addition, the described hardware regular expression filters do not need to know the type of graph encoding (NFD/NFC/NFKD/NFKC) that was used to encode the symbols.

As described above, UTF-8 encodes symbols using one to four byte code units, and UTF-16 encodes symbols using one or two word code units (that is, two bytes or four bytes). Technology is described for hardware regular expression filters that determine the number of encoded bytes (referred to herein as "symbol byte length" or "SBL") of each encoded symbol in an input stream. For example, the input stream may be a stream of data read from a memory system, such as a SSD, or other source of input data. The determined symbol byte lengths are then compared to symbol byte lengths of symbols in a trigger to identify any strings in the input stream that match the symbol byte lengths of the trigger.

In embodiments, a trigger may include N symbols, where N is an integer. For example, the trigger may include N=6 symbols: España. In UTF-8, "E" is encoded in 1 byte, "s" is encoded in 1 byte, "p" is encoded in 1 byte, "a" is encoded in 1 byte, "ñ" is encoded in 2 bytes, and "a" is encoded in 1 byte. Thus, this example trigger has N=6 symbol byte lengths: [1] [1] [1] [1] [2] [1], corresponding to symbols España, respectively.

Embodiments of the described hardware regular expression filters identify strings of N symbols (referred to herein as "N-symbol strings") that have symbol byte lengths matching the symbol byte lengths of the trigger. In particular, embodiments of the described hardware regular expression filters determine the symbol byte length of symbols in each N-symbol string of input data, and compare the determined symbol byte lengths for each N-symbol string with the N symbol byte lengths of the trigger to identify N-symbol strings having symbol byte lengths that match the symbol byte lengths of the trigger. To reduce complexity and to make hardware implementations feasible, the described hardware circuits do not identify or compare actual symbols—only symbol byte lengths are compared.

Any N-symbol string of input data that has matching symbol byte lengths is identified as relevant, because such a string may match the entire regular expression search pattern. For example, if a string of N=6 symbols in the input stream is "España", the symbol byte lengths of the string are [1] [1] [1] [1] [2] [1], and thus the string is identified as relevant, because such a string may match the entire regular expression search pattern.

Any N-symbol string of input data that does not have matching symbol byte lengths is irrelevant and can be ignored, because such a string can never match the trigger, and therefore can never match the entire regular expression search pattern. For example, if a string of N=6 symbols in the input stream is " Éspañaa", the symbol byte lengths of the string are [3] [1] [1] [1] [2] [1], and thus the string can be ignored because the symbols in the string cannot match the symbols in the trigger.

Because the described hardware regular expression filters do not identify or compare the actual symbols, false positives may occur. For example, if a string of N=6 symbols in the input stream is "cabaña", the symbol byte lengths of the string are [1] [1] [1][1] [2] [1], and thus the string is identified as relevant, because the symbol byte lengths of the string match the symbol byte lengths of the trigger, and therefore such a string may match the entire regular expression search pattern.

The filtered data that includes the identified relevant strings may then be transferred to a processor (e.g., on the host device) to perform the remaining regular expression matching in software. Even though the identified relevant strings may include false positives, the filtered data still eliminates from consideration strings in the input data stream that cannot match the regular expression. Indeed, if no N-symbol strings match the symbol byte lengths of the trigger, there is no reason to transfer the data to the host because the data cannot match the regular expression.

Accordingly, embodiments of the described hardware regular expression filters may be used to filter data that has no likelihood of matching the regular expression. In this regard, the speed and performance of the regular expression software engine can be reduced, and the complexity of the hardware regular expression filter can be reduced, making possible hardware regular expression filters for variable-length encoded data, such as Unicode data.

FIG. 1 is a block diagram of an embodiment of a memory system 100 that implements the described technology. In an embodiment, memory system 100 is an SSD. Memory system 100 also can be a memory card, USB drive or other type of storage system. The proposed technology is not limited to any one type of memory system. Memory system 100 is connected to host 102, which can be a computer, server, electronic device (e.g., smart phone, tablet or other mobile device), appliance, or another apparatus that uses memory and has data processing capabilities. In some embodiments, host 102 is separate from, but connected to, memory system 100. In other embodiments, memory system 100 is embedded within host 102.

The components of memory system 100 depicted in FIG. 1 are electrical circuits. Memory system 100 includes a controller 104 connected to one or more memory die 106 and local high speed volatile memory 108 (e.g., DRAM). The one or more memory die 106 each include a plurality of non-volatile memory cells. More information about the structure of each memory die 106 is provided below. Local high speed volatile memory 108 is used by controller 104 to perform certain functions.

Controller 104 includes a host interface 110 that is connected to and in communication with host 102. In one embodiment, host interface 110 provides a PCIe interface. Other interfaces can also be used, such as SCSI, SATA, etc. Host interface 110 is also connected to a network-on-chip (NOC) 112, which is a communication subsystem on an integrated circuit. In other embodiments, NOC 112 can be replaced by a bus.

Connected to and in communication with NOC 112 is processor 114, ECC engine 116, memory interface 118, and DRAM controller 120. DRAM controller 120 is used to operate and communicate with local high speed volatile memory 108 (e.g., DRAM). In other embodiments, local high speed volatile memory 108 can be SRAM or another type of volatile memory.

ECC engine 116 performs error correction. For example, ECC engine 116 performs data encoding and decoding, as per the implemented ECC technique. In one embodiment, ECC engine 116 is an electrical circuit programmed by software. For example, ECC engine 116 can be a processor that can be programmed. In other embodiments, ECC engine 116 is a custom and dedicated hardware circuit without any software. In another embodiment, the function of ECC engine 116 is implemented by processor 114.

Processor 114 performs the various controller memory operations, such as programming, erasing, reading, as well as memory management processes. In an embodiment, processor 114 is programmed by firmware. In other embodiments, processor 114 is a custom and dedicated hardware circuit without any software. In an embodiment, processor 114 also implements a translation module, as a software/firmware process or as a dedicated hardware circuit.

In an embodiment, memory interface 118 communicates with one or more memory die 106. In an embodiment, memory interface 118 provides a Toggle Mode interface. Other interfaces also can be used. In some example implementations, memory interface 118 (or another portion of controller 104) implements a scheduler and buffer for transmitting data to and receiving data from one or more memory die.

Figure 2:
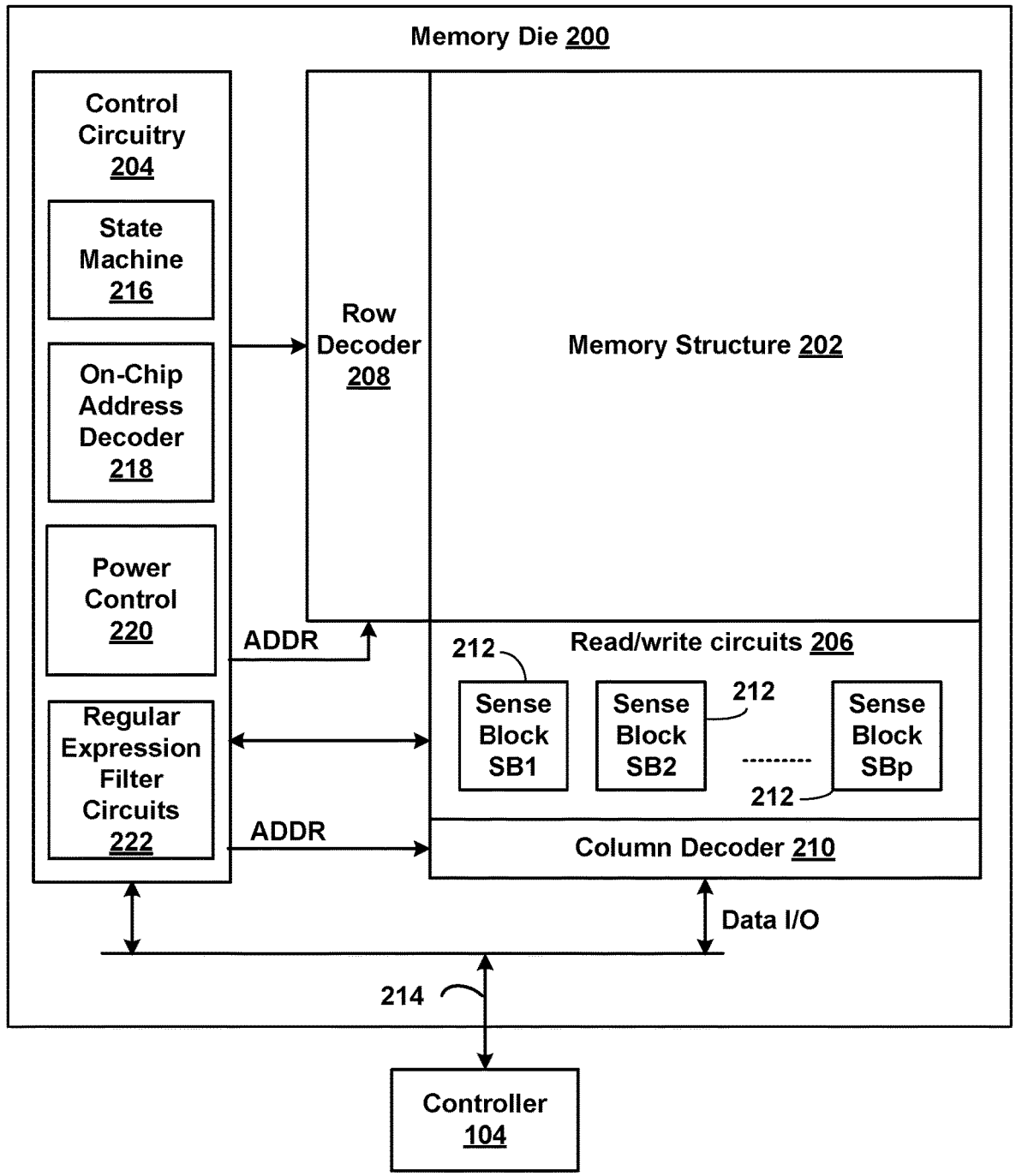
FIG. 2 is a block diagram of one embodiment of a memory die.

FIG. 2 is a functional block diagram of one embodiment of a memory die 200. Each of the one or more memory die 106 of FIG. 1 can be implemented as memory die 200 of FIG. 2. The components depicted in FIG. 2 are electrical circuits. In an embodiment, each memory die 200 includes a memory structure 202, control circuitry 204, and read/write circuits 206. Memory structure 202 is addressable by word lines via a row decoder 208 and by bit lines via a column decoder 210.

In an embodiment, read/write circuits 206 include multiple sense blocks 212 including SB1, SB2, . . . , SBp (sensing circuitry) and allow a page (or multiple pages) of data in multiple memory cells to be read or programmed (written) in parallel. In an embodiment, each sense block 212 includes a sense amplifier and a set of latches connected to the bit line. The latches store data to be written and/or data that has been read. In an embodiment, the sense amplifier of each sense block 212 includes bit line drivers. In an embodiment, commands and data are transferred between controller 104 and memory die 200 via lines 214. In an embodiment, memory die 200 includes a set of input and/or output (I/O) pins that connect to lines 214.

In an embodiment, control circuitry 204 cooperates with read/write circuits 206 to perform memory operations (e.g., write, read, erase, and others) on memory structure 202. In an embodiment, control circuitry 204 includes a state machine 216, an on-chip address decoder 218, and a power control module 220. In an embodiment, control circuitry 204 also includes regular expression filter circuits 222.

In an embodiment, state machine 216 provides die-level control of memory operations. In an embodiment, state machine 216 is programmable by software. In other embodiments, state machine 216 does not use software and is completely implemented in hardware (e.g., electrical circuits). In some embodiments, state machine 216 can be replaced by a microcontroller or microprocessor. In an embodiment, control circuitry 204 includes buffers such as registers, ROM fuses and other storage devices for storing default values such as base voltages and other parameters.

On-chip address decoder 218 provides an address interface between addresses used by controller 104 to the hardware address used by row decoder 208 and column decoder 210. Power control module 220 controls the power and voltages supplied to the word lines and bit lines during memory operations. Power control module 220 may include charge pumps for creating voltages.

As described in more detail below, regular expression filter circuits 222 includes circuits that determine the symbol byte length of symbols in N-symbol strings of input data (e.g., a stream of data read from memory structure 202) and compare the determined symbol byte lengths for each N-symbol string with N symbol byte lengths of a trigger to identify N-symbol strings having symbol byte lengths that match the symbol byte lengths of the trigger.

For purposes of this document, control circuitry 204, read/write circuits 206, row decoder 208 and column decoder 210 comprise a control circuit for memory structure 202. In other embodiments, other circuits that support and operate on memory structure 202 can be referred to as a control circuit. For example, in some embodiments, controller 104 can operate as the control circuit or can be part of the control circuit. The control circuit also can be implemented as a microprocessor or other type of processor that is hardwired or programmed to perform the functions described herein.

In an embodiment, memory structure 202 is a three dimensional memory array of non-volatile memory cells. In an embodiment, memory structure 202 is a monolithic three dimensional memory array in which multiple memory levels are formed above a single substrate, such as a wafer. The memory structure may be any type of non-volatile memory that is formed in one or more physical levels of arrays of memory cells having an active area disposed above a silicon (or other type of) substrate. In one example, the non-volatile memory cells of memory structure 202 include vertical NAND strings with charge-trapping material such as described. A NAND string includes memory cells connected by a channel.

In another embodiment, memory structure 202 includes a two dimensional memory array of non-volatile memory cells. In an example, the non-volatile memory cells are NAND flash memory cells utilizing floating gates. Other types of memory cells (e.g., NOR-type flash memory) also can be used.

The exact type of memory array architecture or memory cell included in memory structure 202 is not limited to the examples above. Many different types of memory array architectures or memory cell technologies can be used to form memory structure 202. No particular non-volatile memory technology is required for purposes of the new technology described herein.

Other examples of suitable technologies for memory cells of the memory structure 202 include ReRAM memories, magnetoresistive memory (MRAM), phase change memory (PCM), and the like. Examples of suitable technologies for architectures of memory structure 202 include two dimensional arrays, three dimensional arrays, cross-point arrays, stacked two dimensional arrays, vertical bit line arrays, and the like.

One example of a cross point memory includes reversible resistance-switching elements arranged in cross point arrays accessed by X lines and Y lines (e.g., word lines and bit lines). In another embodiment, the memory cells may include conductive bridge memory elements. A conductive bridge memory element also may be referred to as a programmable metallization cell.

A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of solid electrolyte between the two electrodes.

MRAM stores data using magnetic storage elements. The magnetic storage elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—$Sb_2Te_3$ super lattice to achieve non-thermal phase changes by simply changing the coordination state of Germanium atoms with a laser pulse (or light pulse from another source). Therefore, the doses of programming are laser pulses. The memory cells can be inhibited from programming by blocking the memory cells from receiving the light.

A person of ordinary skill in the art will recognize that the technology described herein is not limited to a single specific memory structure, but covers many relevant memory structures within the scope of the technology as described herein and as understood by one of ordinary skill in the art.

Figure 3:
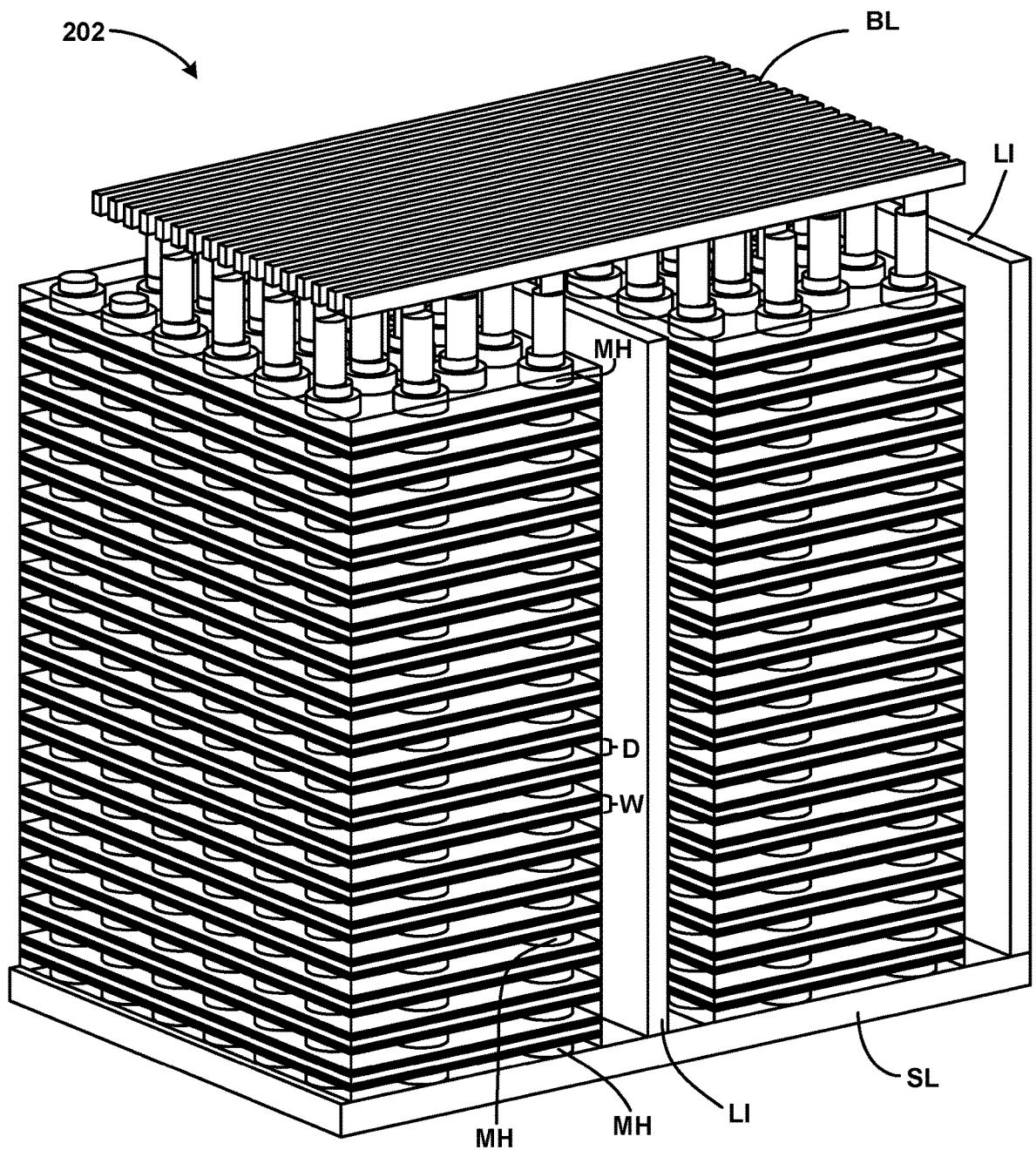
FIG. 3 is a perspective view of a portion of one embodiment of a three dimensional memory structure.

FIG. 3 is a perspective view of a portion of an embodiment of a three dimensional memory array that includes memory structure 202. In an embodiment, memory structure 202 includes multiple non-volatile memory cells. For example, FIG. 3 shows a portion of one block of memory cells. The structure depicted includes a set of bit lines BL positioned above a stack of alternating dielectric layers and conductive layers. For example purposes, one of the dielectric layers is marked as D and one of the conductive layers (also called word line layers) is marked as W.

The number of alternating dielectric layers and conductive layers can vary based on specific implementation requirements. One set of embodiments includes between 108-300 alternating dielectric layers and conductive layers. One example embodiment includes 96 data word line layers, 8 select layers, 6 dummy word line layers and 110 dielectric layers. More or less than 108-300 layers also can be used. In an embodiment, the alternating dielectric layers and conductive layers are divided into four regions by local interconnects LI. FIG. 3 shows two regions and two local interconnects LI.

A source line layer SL is below the alternating dielectric layers and word line layers. Memory holes are formed in the stack of alternating dielectric layers and conductive layers. For example, one of the memory holes is marked as MH. Note that in FIG. 3 the dielectric layers are depicted as see-through so that the reader can see the memory holes positioned in the stack of alternating dielectric layers and conductive layers.

In an embodiment, NAND strings are formed by filling the memory hole with materials including a charge-trapping material to create a vertical column of memory cells (also referred to as a memory column). In an embodiment, each memory cell can store one or more bits of data. In an embodiment, each memory hole MH is associated with and coupled to a corresponding one of bit lines BL. In an embodiment, each bit line BL is coupled to one or more memory holes MH.

As described above, technology is described for hardware regular expression filters that can be used with all variants of a variable-length encoding scheme such as Unicode and that can correctly interpret the data. In embodiments, hardware regular expression filters are described that do not determine the actual symbols or the composition of the symbols in an input stream. Instead, as described in more detail below, hardware regular expression filters are described that determine symbol byte lengths in strings of variable-length encoded input data, and identify strings having symbol byte lengths that match symbol byte lengths of a trigger.

As described above, text data (such as in documents and web pages) are typically encoded using a variable-length encoding scheme, such as UTF-8 and UTF 16, and are therefore typically stored in memory systems (such as memory system 100 of FIG. 1) as UTF-8 or UTF 16 encoded data. UTF-8 encodes symbols using one to four byte code units. UTF-8 encoded symbols have the format shown below in Table 1:

TABLE 1

| Symbol Byte Length | $1^{st}$ Byte | $2^{nd}$ Byte | $3^{rd}$ Byte | $4^{th}$ Byte |
|---|---|---|---|---|
| 1 Byte | 0xxx_xxxx | | | |
| 2 Bytes | 110x_xxxx | 10xx_xxxx | | |
| 3 Bytes | 1110_xxxx | 10xx_xxxx | 10xx_xxxx | |
| 4 Bytes | 1111_0xxx | 10xx_xxxx | 10xx_xxxx | 10xx_xxxx | where the "x" characters are replaced by the bits of the code corresponding to a particular symbol.

As seen from Table 1, the symbol byte length for a UTF-8 encoded symbol may be determined from the first byte. In particular, if the most significant bit of a byte is 0, the symbol byte length is 1. For all other encodings, the number of leading is in a byte equals the symbol byte length. That is, if bits 7-5 of a byte equal 110, the symbol byte length is 2, if bits 7-4 of a byte equal 1110, the symbol byte length is 3, and if bits 7-3 of a byte equal 11110, the symbol byte length is 4. For multi-byte encoded symbols, all bytes following the first byte have bits 7-6 equal to 10. Such bytes will be referred to herein as "Skip Bytes" having a symbol byte length designated as "S." Other values may be used for the symbol byte length of Skip Bytes.

For example, the UTF-8 encoding of symbols @, §, Ẍ, ◉ is shown in Table 2:

TABLE 2

| Symbol | Symbol Byte Length | $1^{st}$ Byte | $2^{nd}$ Byte | $3^{rd}$ Byte | $4^{th}$ Byte |
|---|---|---|---|---|---|
| @ | 1 Byte | 0100_0000 | | | |
| § | 2 Bytes | 1100_0010 | 1010_0111 | | |
| Ẍ | 3 Bytes | 1110_0001 | 1011_1010 | 1000_1010 | |
| ◉ | 4 Bytes | 1111_0000 | 1001_1111 | 1000_0000 | 1001 1001 |

For example, as shown above symbol ◉ has a symbol byte length of four bytes. Bits 7-3 of the first byte equal 11110, and bits 7-6 of bytes 2-4 equal 10. Thus bytes 2-4 are Skip Bytes. Symbol Ẋ has a symbol byte length of three bytes. Bits 7-4 of the first byte equal 1110, and bits 7-6 of bytes 2-3 equal 10. Thus bytes 2-3 are Skip Bytes. Symbol § has a symbol byte length of two bytes. Bits 7-5 of the first byte equal 110, and bits 7-6 of byte 2 equal 10. Thus byte 2 is a Skip Byte. Symbol @ has a symbol byte length of one byte. Bit 7 of the first byte equals 0.

Referring again to Table 1, each byte of a UTF-8 encoded symbol is either a first byte that includes information that may be used to determine a symbol byte length of an associated encoded symbol, or a Skip Byte that does not include such symbol byte length information. In an embodiment, each byte of a UTF-8 encoded symbol has an associated "byte length value" or "BLV" that may be identified based on presence or absence of predetermined bit patterns in each byte.

In an embodiment, each first byte has an associated byte length value of 1, 2, 3 or 4, based on the values of bits 7-3 of the byte, as described above. In an embodiment, each Skip Byte has an associated byte length value of S, determined based on bits 7-6 of the byte. Thus, if a byte of a UTF-8 encoded symbol has an associated byte length value of 1, 2, 3, or 4, the symbol byte length of the encoded symbol equals the byte length value associated with the byte. If a byte of a UTF-8 encoded symbol has an associated byte length value of S, the byte is a Skip Byte and does not include symbol byte length information of the encoded symbol.

Figure 4:
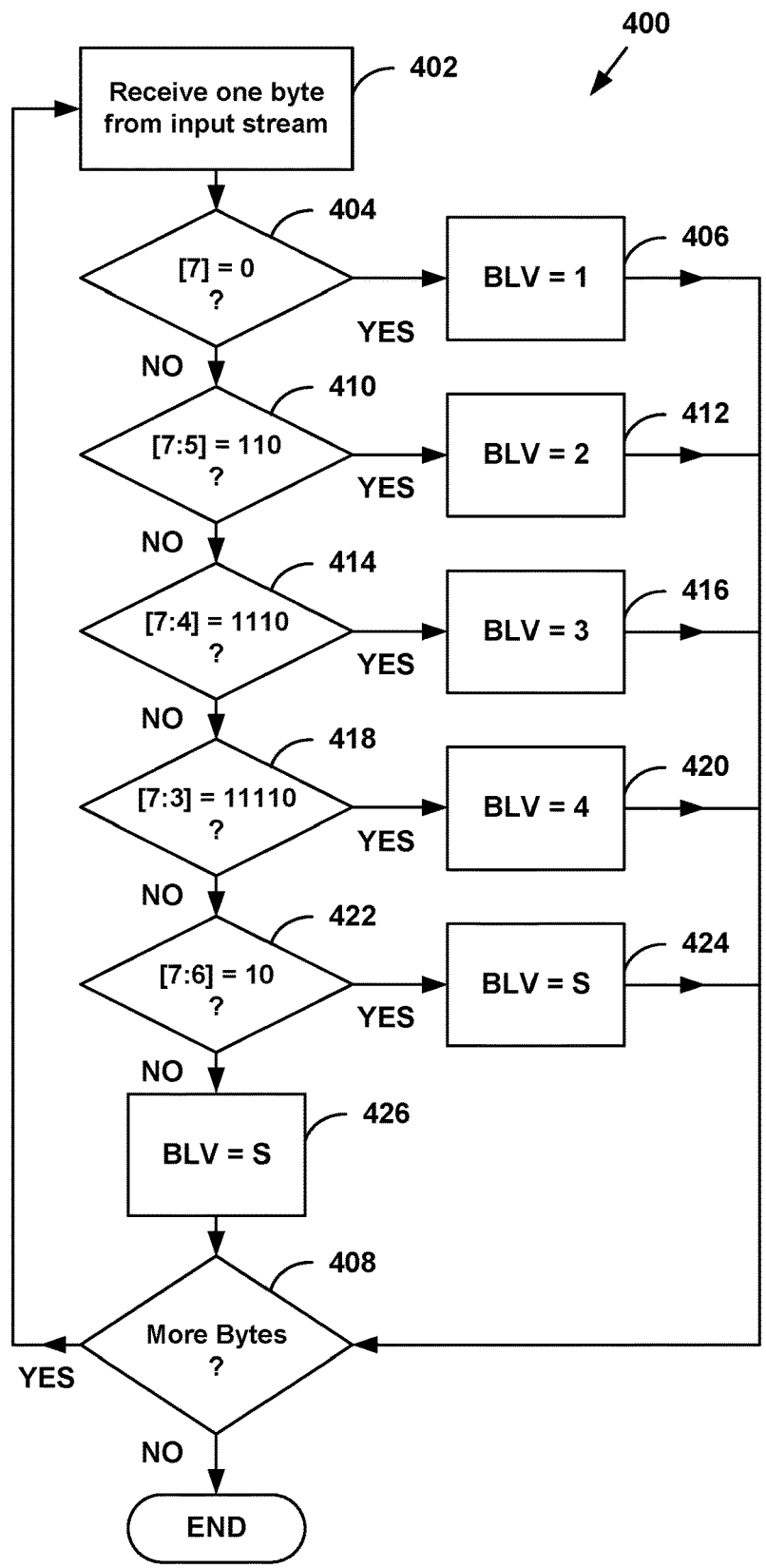
FIG. 4 is a flowchart describing an embodiment of a process for determining associated byte length values for each byte of a UTF-8 encoded symbol stream.

FIG. 4 is a flowchart describing an embodiment of a process 400 for determining associated byte length values (BLVs) for each byte of a UTF-8 encoded symbol stream. In an example embodiment, process 400 is performed on memory die 106 (FIG. 1) using the control circuits discussed above. For example, process 400 can be performed at the direction of state machine 216 (FIG. 2). In another example embodiment, process 400 is performed on controller 104 (FIG. 1).

At step 402, a byte of data is received from an input stream of UTF-8 encoded symbols. For example, the input stream may be a stream of data read from memory die 106 (FIG. 1), or other source of input data.

At step 404, a determination is made whether bit 7 of the received byte equals 0. If yes, at step 406 the associated byte length value of the byte is set to 1. Process 400 then proceeds to step 408 to determine if there are any additional bytes to evaluate. If yes, process 400 returns to step 402 to receive the next byte. If at step 408 a determination is made that there are no additional bytes to evaluate process 400 terminates.

If at step 404 a determination is made that bit 7 of the received byte does not equal 0, then at step 410 a determination is made whether bits 7-5 of the received byte equals 110. If yes, at step 412 the associated byte length value of the byte is set to 2. Process 400 then proceeds to step 408 to determine if there are any additional bytes to evaluate. If yes, process 400 returns to step 402 to receive the next byte. If at step 408 a determination is made that there are no additional bytes to evaluate process 400 terminates.

If at step 410 a determination is made that bits 7-5 of the received byte do not equal 110, then at step 414 a determination is made whether bits 7-4 of the received byte equals 1110. If yes, at step 416 the associated byte length value of the byte is set to 3. Process 400 then proceeds to step 408 to determine if there are any additional bytes to evaluate. If yes, process 400 returns to step 402 to receive the next byte. If at step 408 a determination is made that there are no additional bytes to evaluate process 400 terminates.

If at step 414 a determination is made that bits 7-4 of the received byte do not equal 1110, then at step 418 a determination is made whether bits 7-3 of the received byte equals 11110. If yes, at step 420 the associated byte length value of the byte is set to 4. Process 400 then proceeds to step 408 to determine if there are any additional bytes to evaluate. If yes, process 400 returns to step 402 to receive the next byte. If at step 408 a determination is made that there are no additional bytes to evaluate process 400 terminates.

If at step 418 a determination is made that bits 7-3 of the received byte do not equal 11110, then at step 422 a determination is made whether bits 7-6 of the received byte equal 10. If yes, the byte is a Skip Byte and at step 424 the associated byte length value of the byte is set to S. Process 400 then proceeds to step 408 to determine if there are any additional bytes to evaluate. If yes, process 400 returns to step 402 to receive the next byte. If at step 408 a determination is made that there are no additional bytes to evaluate process 400 terminates.

If at step 422 a determination is made that bits 7-6 of the received byte do not equal 10, the byte corresponds to an erroneous symbol encoding (also referred to as a "non-resolved encoding") because the received byte does not conform with the format depicted above in Table 1. For example, an error in one or more bits may cause a non-resolved encoding. In an embodiment, such non-resolved encodings are treated as Skip Bytes so that such erroneous symbols are ignored.

Accordingly, at step 426 the associated byte length value of the byte is set to S. Process 400 then proceeds to step 408 to determine if there are any additional bytes to evaluate. If yes, process 400 returns to step 402 to receive the next byte. If at step 408 a determination is made that there are no additional bytes to evaluate process 400 terminates. Persons of ordinary skill in the art will understand that the order of steps of process 400 may be changed.

Figure 5:
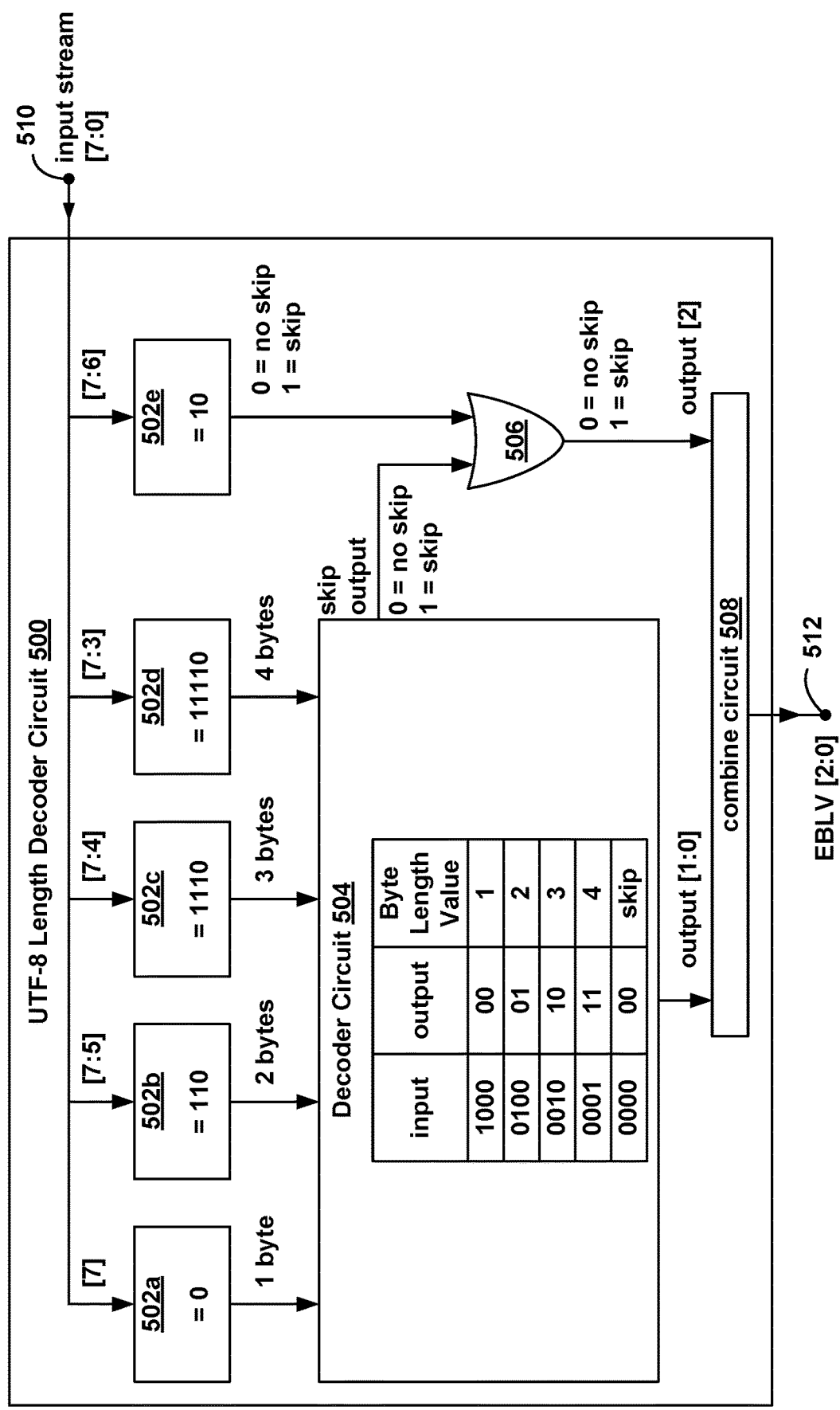
FIG. 5 is a diagram of an embodiment of a hardware circuit for determining byte length values associated with bytes of UTF-8 encoded symbols.

FIG. 5 is a diagram of an embodiment of a hardware circuit (UTF-8 Length Decoder Circuit 500) for determining byte length values associated with bytes of UTF-8 encoded symbols. In an embodiment, UTF-8 Length Decoder Circuit 500 may be implemented on one or more memory die 106 (FIG. 1), controller 104 (FIG. 1), or a combination thereof. In an embodiment, UTF-8 Length Decoder Circuit 500 may be implemented in regular expression filter circuits 222 (FIG. 2). In other embodiments, UTF-8 Length Decoder Circuit 500 may be implemented in other hardware circuits included in or coupled to memory system 100 (FIG. 1).

In an embodiment, UTF-8 Length Decoder Circuit 500 includes compare circuits 502a-502e, a decoder circuit 504, an OR gate 506, and a combine circuit 508. In an embodiment, UTF-8 Length Decoder Circuit 500 receives input data 8 bits (one byte) at a time from an input stream at an input terminal 510, determines an associated byte length value for each received input byte, and outputs at an output terminal 512 an encoded byte length value (EBLV) corresponding to the determined byte length value.

Each of compare circuits 502a-502e has an input terminal coupled to input terminal 510, and provides a single bit output value (0 or 1) to decoder circuit 504 for each received input byte. In an embodiment, compare circuits 502a-502e determine the associated byte length value of each received input byte.

In particular, compare circuit 502a compares bit 7 of the received input byte with the binary value "0" (corresponding to step 404 in process 400 of FIG. 4). If bit 7=0, compare circuit 502a provides an output of 1 (indicating that the received input byte has an associated byte length value of 1). Otherwise, compare circuit 502a provides an output of 0 if bit 7≠0.

Compare circuit 502b compares bits 7-5 of the received input byte with the 3-bit binary value "110" (corresponding to step 410 in process 400 of FIG. 4). If bits 7-5=110, compare circuit 502b provides an output of 1 (indicating that the received input byte has an associated byte length value of 2). Otherwise, compare circuit 502b provides an output of 0 if bits 7-5≠110.

Compare circuit 502c compares bits 7-4 of the received input byte with the 4-bit binary value "1110" (corresponding to step 414 in process 400 of FIG. 4). If bits 7-4=1110, compare circuit 502c provides an output of 1 (indicating that the received input byte has an associated byte length value of 3). Otherwise, compare circuit 502c provides an output of 0 if bits 7-4≠1110.

Compare circuit 502d compares bits 7-3 of the received input byte with the 5-bit binary value "11110" (corresponding to step 418 in process 400 of FIG. 4). If bits 7-3=11110, compare circuit 502d provides an output of 1 (indicating that the received input byte has an associated byte length value of 4). Otherwise, compare circuit 502d provides an output of 0 if bits 7-3≠11110.

Compare circuit 502e compares bits 7-6 of the received input byte with the 2-bit binary value "10" (corresponding to step 422 in process 400 of FIG. 4). If bits 7-6=10, compare circuit 502e provides an output of 1 (indicating that the received input byte is a Skip Byte, and has an associated byte length value of S). Otherwise, compare circuit 502e provides an output of 0 if bits 7-6≠10.

Decoder circuit 504 receives as a four bit input the 1-bit outputs of compare circuits 502a-502d, generates a 2-bit decoder output based on the input to decoder circuit 504, and also generates a 1-bit "skip output" based on the input to decoder circuit 504. In an embodiment, the outputs of compare circuits 502a-502d constitute bits 3-0, respectively, of the input to decoder circuit 504.

As depicted in FIG. 5, decoder circuit 504 provides a 2-bit decoder output corresponding to the input to decoder circuit 504, shown below in Table 3:

TABLE 3

| Decoder Input | Decoder Output | Byte Length Value |
| --- | --- | --- |
| 1000 | 00 | 1 |
| 0100 | 01 | 2 |
| 0010 | 10 | 3 |
| 0001 | 11 | 4 |
| 0000 | 00 | S |

The last row of Table 3 is used for non-resolved encoding in circumstances in which none of compare circuits 502a-502d generate a non-zero output (corresponding to step 426 in process 400 of FIG. 4). As described above, such non-resolved encodings are treated as Skip Bytes so that such erroneous symbols are ignored. As depicted in FIG. 5, decoder circuit 504 provides a 1-bit skip output corresponding to the input to decoder circuit 504, shown below in Table 4:

TABLE 4

| Decoder Input | Decoder Skip Output |
| --- | --- |
| 1000 | 0 |
| 0100 | 0 |
| 0010 | 0 |
| 0001 | 0 |
| 0000 | 1 |

The skip output of decoder circuit 504 and the output of compare circuit 502e are coupled as inputs to OR gate 506, which provides a 1 bit output to combine circuit 508. Thus, the output of OR gate 506 equals 1 if either the output of compare circuit 502e or the skip output of decoder circuit 504 equal 1 (indicating a Skip Byte), and otherwise equals 0.

Combine circuit 508 receives as inputs the output of decoder circuit 504 and the output of OR gate 506, and provides at output terminal 512 the encoded byte length value EBLV corresponding to the determined byte length value for each received input byte.

In an embodiment, the encoded byte length value EBLV is a 3-bit signal, with the 2-bit decoder output of decoder circuit 504 forming bits 1 and 0, and the output of OR gate 506 forming bit 2 of the encoded byte length value EBLV. Table 5, below, depicts example encoded byte length values for UTF-8 Length Decoder Circuit 500:

TABLE 5

| Encoded Byte Length Value | Byte Length Value |
| --- | --- |
| 000 | 1 |
| 001 | 2 |
| 010 | 3 |
| 011 | 4 |
| 100 | S |

In this embodiment, a byte length value of 1 is encoded as 000, a byte length value of 2 is encoded as 001, a byte length value of 3 is encoded as 011, a byte length value of 4 is encoded as 011, and a byte length value of S is encoded as 100. Persons of ordinary skill in the art will understand that other byte length value encodings may be used.

FIG. 6 is a diagram depicting an example byte stream of UTF-8 encoded symbols ● Ẋ § @. As described above and depicted in Table 2, symbol ● has a UTF-8 symbol byte length of 4 bytes, symbol Ẋ has a UTF-8 symbol byte length of 3 bytes, symbol § has a symbol byte length of 2 bytes, and symbol @ has a UTF-8 symbol byte length of one byte. Thus, the example UTF-8 byte stream includes a total of 4+3+2+1=10 bytes $B_0, B_1, \ldots, B_9$.

The example UTF-8 byte stream of FIG. 6 may be applied as the input to UTF-8 Length Decoder Circuit 500 of FIG. 5. The table depicted in FIG. 6 illustrates the corresponding outputs of compare circuits 502a-502e, and the associated byte length value BLV and encoded byte length value EBLV for each received input byte.

In particular, byte $B_0$ (11110000) is the first byte of the UTF-8 encoded symbol ●. The outputs of compare circuits 502a-502d are 0001, which corresponds to an associated byte length value BLV=4. Decoder circuit 504 provides a decoder output of 11, and a skip output of 0. The output of compare circuit 502e is 0, and the output of OR gate 506 is 0. Accordingly, for byte $B_0$ combine circuit 508 provides an encoded byte length value EBLV=011.

Byte $B_1$ (10011111) is the second byte of the UTF-8 encoded symbol ●. The outputs of compare circuits 502a-502d are 0000, which corresponds to an associated byte length value BLV=S. Decoder circuit 504 provides a decoder output of 00, and a skip output of 1. The output of compare circuit 502e is 1, and the output of OR gate 506 is 1. Accordingly, for byte $B_1$ combine circuit 508 provides an encoded byte length value EBLV=100.

Byte $B_2$ (10000000) is the third byte of the UTF-8 encoded symbol ●. The outputs of compare circuits 502a-502d are 0000, which corresponds to an associated byte length value BLV=S. Decoder circuit 504 provides a decoder output of 00, and a skip output of 1. The output of compare circuit 502e is 1, and the output of OR gate 506 is 1. Accordingly, for byte $B_2$ combine circuit 508 provides an encoded byte length value EBLV=100.

Byte $B_3$ (10011001) is the fourth byte of the UTF-8 encoded symbol ●. The outputs of compare circuits 502a-502d are 0000, which corresponds to an associated byte length value BLV=S. Decoder circuit 504 provides a decoder output of 00, and a skip output of 1. The output of compare circuit 502e is 1, and the output of OR gate 506 is 1. Accordingly, for byte $B_3$ combine circuit 508 provides an encoded byte length value EBLV=100.

Byte $B_4$ (11100001) is the first byte of the UTF-8 encoded symbol Ẋ. The outputs of compare circuits 502a-502d are 0010, which corresponds to an associated byte length value BLV=3. Decoder circuit 504 provides a decoder output of 10, and a skip output of 0. The output of compare circuit 502e is 0, and the output of OR gate 506 is 0. Accordingly, for byte $B_4$ combine circuit 508 provides an encoded byte length value EBLV=010.

Byte $B_5$ (10111010) is the second byte of the UTF-8 encoded symbol Ẋ. The outputs of compare circuits 502a-502d are 0000, which corresponds to an associated byte length value BLV=S. Decoder circuit 504 provides a decoder output of 00, and a skip output of 1. The output of compare circuit 502e is 1, and the output of OR gate 506 is 1. Accordingly, for byte $B_5$ combine circuit 508 provides an encoded byte length value EBLV=100.

Byte $B_6$ (10001010) is the third byte of the UTF-8 encoded symbol Ẋ. The outputs of compare circuits 502a-502d are 0000, which corresponds to an associated byte length value BLV=S. Decoder circuit 504 provides a decoder output of 00, and a skip output of 1. The output of compare circuit 502e is 1, and the output of OR gate 506 is 1. Accordingly, for byte $B_6$ combine circuit 508 provides an encoded byte length value EBLV=100.

Byte $B_7$ (11000010) is the first byte of the UTF-8 encoded symbol §. The outputs of compare circuits 502a-502d are 0100, which corresponds to an associated byte length value BLV=2. Decoder circuit 504 provides a decoder output of 01, and a skip output of 0. The output of compare circuit 502e is 0, and the output of OR gate 506 is 0. Accordingly, for byte $B_7$ combine circuit 508 provides an encoded byte length value EBLV=001.

Byte $B_8$ (10100111) is the second byte of the UTF-8 encoded symbol §. The outputs of compare circuits 502a-502d are 0000, which corresponds to an associated byte length value BLV=S. Decoder circuit 504 provides a decoder output of 00, and a skip output of 1. The output of compare circuit 502e is 1, and the output of OR gate 506 is 1. Accordingly, for byte $B_8$ combine circuit 508 provides an encoded byte length value EBLV=100.

Byte $B_9$ (01000000) is the first (and only) byte of the UTF-8 encoded symbol @. The outputs of compare circuits 502a-502d are 1000, which corresponds to an associated byte length value BLV=1. Decoder circuit 504 provides a decoder output of 00, and a skip output of 0. The output of compare circuit 502e is 0, and the output of OR gate 506 is 0. Accordingly, for byte $B_9$ combine circuit 508 provides an encoded byte length value EBLV=000.

Thus, as depicted in FIG. 6, the associated byte length values for bytes $B_0$, $B_1$, $B_2$, $B_3$, $B_4$, $B_5$, $B_6$, $B_7$, $B_8$, $B_9$ are 4, S, S, S, 3, S, S, 2, S, 1, respectively. As described above, Skip Bytes do not include symbol byte length information. Symbol byte lengths for the encoded symbols may be obtained by filtering the S byte length values from the stream of byte length values determined by UTF-8 Length Decoder Circuit 500. Thus, in this example the UTF-8 symbol byte lengths for encoded symbols ●, Ẋ, §, @ are 4, 3, 2, 1, respectively.

FIG. 7 depicts a conceptual diagram of an embodiment of a technique for filtering S byte length values from the stream of byte length values determined by UTF-8 Length Decoder Circuit 500 in the above example. In an embodiment, the technique is a variation of an odd-even sort that uses the S byte length value as a swap indicator.

In the illustrated example, bytes $B_0$-$B_9$ are displayed across the top row, with their associated byte length values (determined as described above) in the following order: 4 S S S 3 S S 2 S 1. Note that an additional byte $B_{10}$ with an associated byte length value of S is appended at the end of the values determined by UTF-8 Length Decoder Circuit 500, as will be described below. A sequence of comparisons are performed on odd and even indexed pairs of adjacent byte length values. In an embodiment, for each indexed pair, byte length values are swapped if the left byte length value is S and the right byte length value is not S (i.e., 1, 2, 3 or 4).

FIG. 7 uses brackets to illustrate the indexed pairs for each swap iteration. For example, beginning with iteration 0 (odd), the first indexed pair includes the first and second byte length values (4 and S), the second indexed pair includes the third and fourth byte length values (S and S), the third indexed pair includes the fifth and sixth byte length values (3 and S), the fourth indexed pair includes the seventh and eighth byte length values (S and 2), and the fifth indexed pair includes the ninth and tenth byte length values (S and 1).

For each indexed pair in which the left byte length value is S and the right byte length value is not S, the byte length values of that indexed pair are swapped. In this example, swaps occur on the byte length values of the fourth and fifth indexed pairs. The byte length values of all other indexed pairs remain unchanged. Thus, after swap iteration 0, the byte length values are in the following order: 4 S S S 3 S 2 S 1 S.

In swap iteration 1 (even), the first indexed pair includes the second and third byte length values (S and S), the second indexed pair includes the fourth and fifth byte length values (S and 3), the third indexed pair includes the sixth and seventh byte length values (S and 2), the fourth indexed pair includes the eighth and ninth byte length values (S and 1), and the fifth indexed pair includes the tenth and eleventh byte length values (S and S). As described above, an additional byte $B_{10}$ with a corresponding byte length value of S was appended at the end of the values determined by UTF-8 Length Decoder Circuit 500. This was done so that for even iterations, indexed pairs can be formed for all byte length values.

Once again, for each indexed pair in which the left byte length value is S and the right byte length value is not S, the byte length values of that indexed pair are swapped. In this example, swaps occur on the byte length values of the second, third and fourth indexed pairs. The byte length values of all other indexed pairs remain unchanged. Thus, after swap iteration 1, the byte length values are in the following order: 4 S S 3 S 2 S 1 S S.

In swap iteration 2 (odd), the first indexed pair includes the first and second byte length values (4 and S), the second indexed pair includes the third and fourth byte length values (S and 3), the third indexed pair includes the fifth and sixth byte length values (S and 2), the fourth indexed pair includes the seventh and eighth byte length values (S and 1), and the fifth indexed pair includes the ninth and tenth byte length values (S and S).

For each indexed pair in which the left byte length value is S and the right byte length value is not S, the byte length values of that indexed pair are swapped. In this example, swaps occur on the byte length values of the second, third and fourth indexed pairs. The byte length values of all other indexed pairs remain unchanged. Thus, after swap iteration 2, the byte length values are in the following order: 4 S 3 S 2 S 1 S S S.

In swap iteration 3 (even), the first indexed pair includes the second and third byte length values (S and 3), the second indexed pair includes the fourth and fifth byte length values (S and 2), the third indexed pair includes the sixth and seventh byte length values (S and 1), the fourth indexed pair includes the eighth and ninth byte length values (S and S), and the fifth indexed pair includes the tenth and eleventh byte length values (S and S).

For each indexed pair in which the left byte length value is S and the right byte length value is not S, the byte length values of that indexed pair are swapped. In this example, swaps occur on the byte length values of the first, second and third indexed pairs. The byte length values of all other indexed pairs remain unchanged. Thus, after swap iteration 3, the byte length values are in the following order: 4 3 S 2 S 1 S S S S.

In swap iteration 4 (odd), the first indexed pair includes the first and second byte length values (4 and 3), the second indexed pair includes the third and fourth byte length values (S and 2), the third indexed pair includes the fifth and sixth byte length values (S and 1), the fourth indexed pair includes the seventh and eighth byte length values (S and S), and the fifth indexed pair includes the ninth and tenth byte length values (S and S).

For each indexed pair in which the left byte length value is S and the right byte length value is not S, the byte length values of that indexed pair are swapped. In this example, swaps occur on the byte length values of the second and third indexed pairs. The byte length values of all other indexed pairs remain unchanged. Thus, after swap iteration 4, the byte length values are in the following order: 4 3 2 S 1 S S S S S.

In swap iteration 5 (even), the first indexed pair includes the second and third byte length values (3 and 2), the second indexed pair includes the fourth and fifth byte length values (S and 1), the third indexed pair includes the sixth and seventh byte length values (S and S), the fourth indexed pair includes the eighth and ninth byte length values (S and S), and the fifth indexed pair includes the tenth and eleventh byte length values (S and 5).

For each indexed pair in which the left byte length value is S and the right byte length value is not S, the byte length values of that indexed pair are swapped. In this example, swaps occur on the byte length values of the second indexed pair. The byte length values of all other indexed pairs remain unchanged. Thus, after swap iteration 5, the byte length values are in the following order: 4 3 2 1 S S S S S S.

Thus, in this example, after five swap iterations the S byte length values are filtered (shifted to the right) from the stream of byte length values determined by UTF-8 Length Decoder Circuit 500, with the UTF-8 encoded symbol byte lengths determined to be 4, 3, 2, 1, respectively.

Figure 8A:
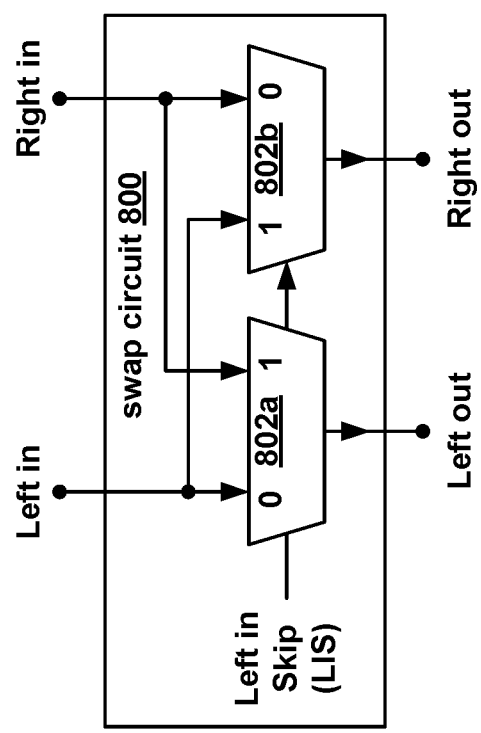
FIG. 8A is an embodiment of a hardware swap circuit that is configured to perform swaps of byte length values.

FIG. 8A depicts an embodiment of a hardware swap circuit 800 that is configured to perform swaps of byte length values, such as described above in the example of FIG. 7. Swap circuit 800 includes a first MUX circuit 802a, a second MUX circuit 802b, a first (left) input terminal, a second (right) input terminal, a first (left) output terminal, and a second (right) output terminal. First MUX circuit 802a and second MUX circuit 802b each have a first (left) input terminal, a second (right) input terminal, a control terminal and an output terminal.

The left input terminal of swap circuit 800 is coupled to the left input terminal of first MUX circuit 802a and the left input terminal of second MUX circuit 802b, and the right input terminal of swap circuit 800 is coupled to the right input terminal of first MUX circuit 802a and the right input terminal of second MUX circuit 802b. The output terminal of first MUX circuit 802a is the left output terminal of swap circuit 800, and the output terminal of second MUX circuit 802b is the right output terminal of swap circuit 800.

The control terminals of first MUX circuit 802a and second MUX circuit 802b are coupled to a control signal Left in Skip (LIS) which has a value 1 if the input signal coupled to the left input terminal of swap circuit 800 is S and the input signal coupled to the right input terminal of swap circuit 800 is not S, and has a value of 0 otherwise.

In an embodiment, if LIS=0, the left input terminal of first MUX circuit 802a is coupled to the output terminal of first MUX circuit 802a, and the right input terminal of second MUX circuit 802b is coupled to the output terminal of second MUX circuit 802b. In an embodiment, if LIS=1, the right input terminal of first MUX circuit 802a is coupled to the output terminal of first MUX circuit 802a, and the left input terminal of second MUX circuit 802b is coupled to the output terminal of second MUX circuit 802b.

More particularly, if LIS=0, the left input terminal of swap circuit 800 is coupled to the left output terminal of swap circuit 800, and the right input terminal of swap circuit 800 is coupled to the right output terminal of swap circuit 800. Thus, if an input signal coupled to the left input terminal of swap circuit 800 is not S, or the input signals coupled to the left and right input terminals of swap circuit 800 are both S, no swap is performed.

If LIS=1, the left input terminal of swap circuit 800 is coupled to the right output terminal of swap circuit 800, and the right input terminal of swap circuit 800 is coupled to the left output terminal of swap circuit 800. Thus, if an input signal coupled to the left input terminal of swap circuit 800 is S and the input signal coupled to the right input terminal of swap circuit 800 is not S, a swap is performed.

Figure 8B:
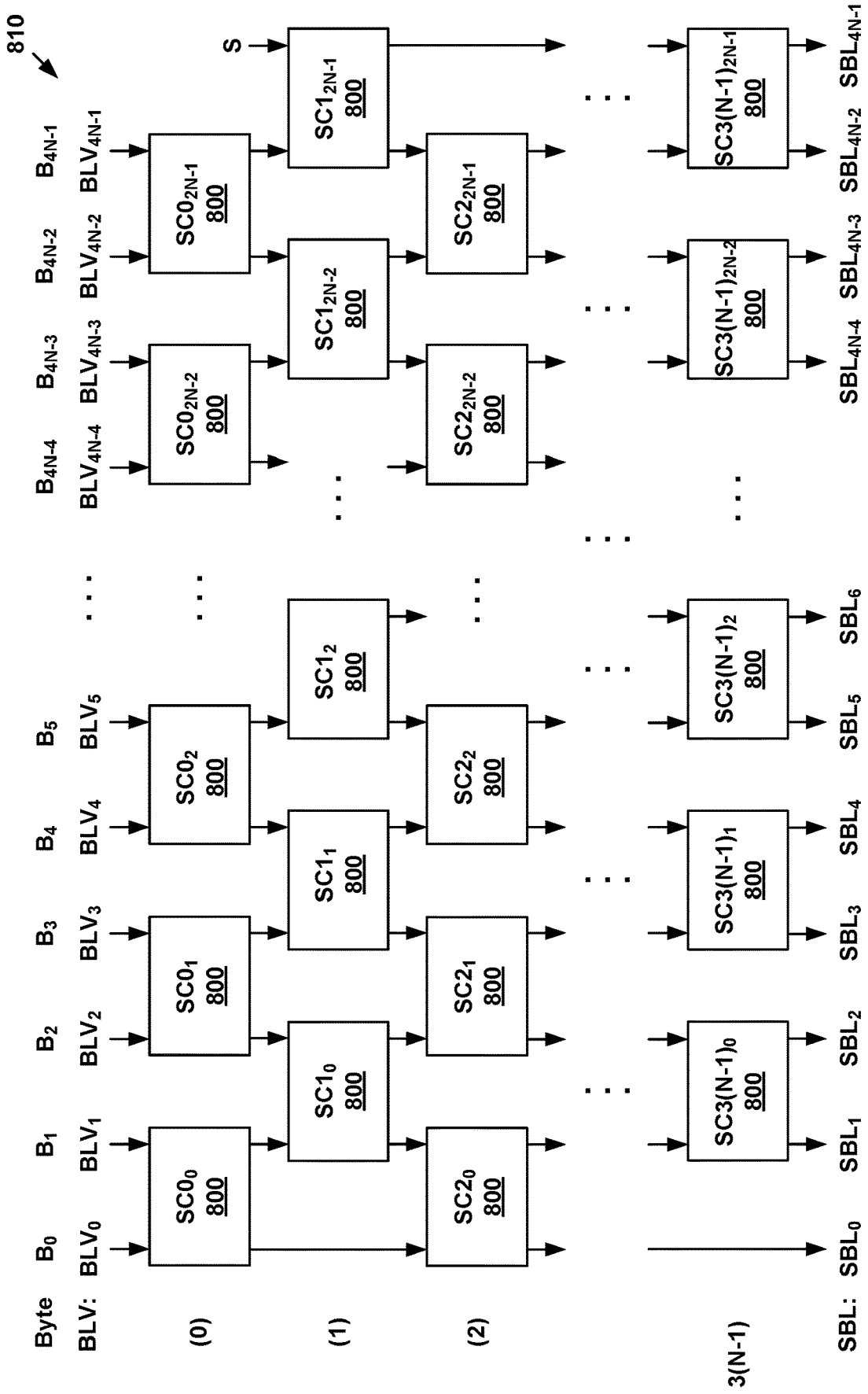
FIG. 8B is a diagram depicting an example hardware skip filter.

FIG. 8B is a diagram depicting an example hardware skip filter 810 for filtering S byte length values from a stream of byte length values determined by UTF-8 Length Decoder Circuit 500. In particular, skip filter 810 is configured to filter S byte length values from a stream of byte length values to provide symbol byte lengths for N symbols. Skip filter 810 includes an array of [3(N−1)+1] rows and 2N columns of swap circuits $SC0_0$, $SC0_1$, $SC0_2$, ..., $SC3(N-1)_{2N-1}$, with each swap circuit being an instance of example swap circuit 800 of FIG. 8A.

As described above, each UTF-8 encoded symbol may include up to 4 bytes, and thus N symbols may include up to 4N bytes. Accordingly, skip filter 810 includes 4N inputs for receiving byte length values $BLV_0$, $BLV_1$, $BLV_2$, ..., $BLV_{4N-1}$ for bytes $B_0$, $B_1$, $B_2$, ..., $B_{4N-1}$, respectively. In an embodiment, if fewer than 4N byte length values are received, all remaining byte length values are assigned a value of S.

In an embodiment, each of the [3(N−1)+1] rows of swap circuits $SC0_0$, $SC0_1$, $SC0_2$, ..., $SC3(N-1)_{2N-1}$ performs a swap iteration, such as described above. In particular, swap circuits $SC0_0$, $SC0_1$, $SC0_2$, ..., $SC0_{2N-1}$ perform swap iteration 0, swap circuits $SC1_0$, $SC1_1$, $SC1_2$, ..., $SC1_{2N-1}$ perform swap iteration 1, swap circuits $SC2_0$, $SC2_1$, $SC2_2$, ..., $SC2_{2N-1}$ perform swap iteration 2, ..., and swap circuits $SC3(N-1)_0$, $SC3(N-1)_1$, $SC3(N-1)_2$, ..., $SC3(N-1)_{2N-1}$ perform swap iteration 3(N−1). Swap circuits $SC3(N-1)_0$, $SC3(N-1)_1$, $SC3(N-1)_2$, ..., $SC3(N-1)_{2N-1}$ output UTF-8 encoded symbol byte lengths $SBL_0$, $SBL_1$, $SBL_2$, ..., $SBL_{4N-1}$, respectively. The first N symbol byte lengths $SBL_0$, $SBL_1$, ... $SBL_{N-1}$ constitute the symbol byte lengths for the N UTF-8 encoded symbols in the byte stream.

Figure 8C:
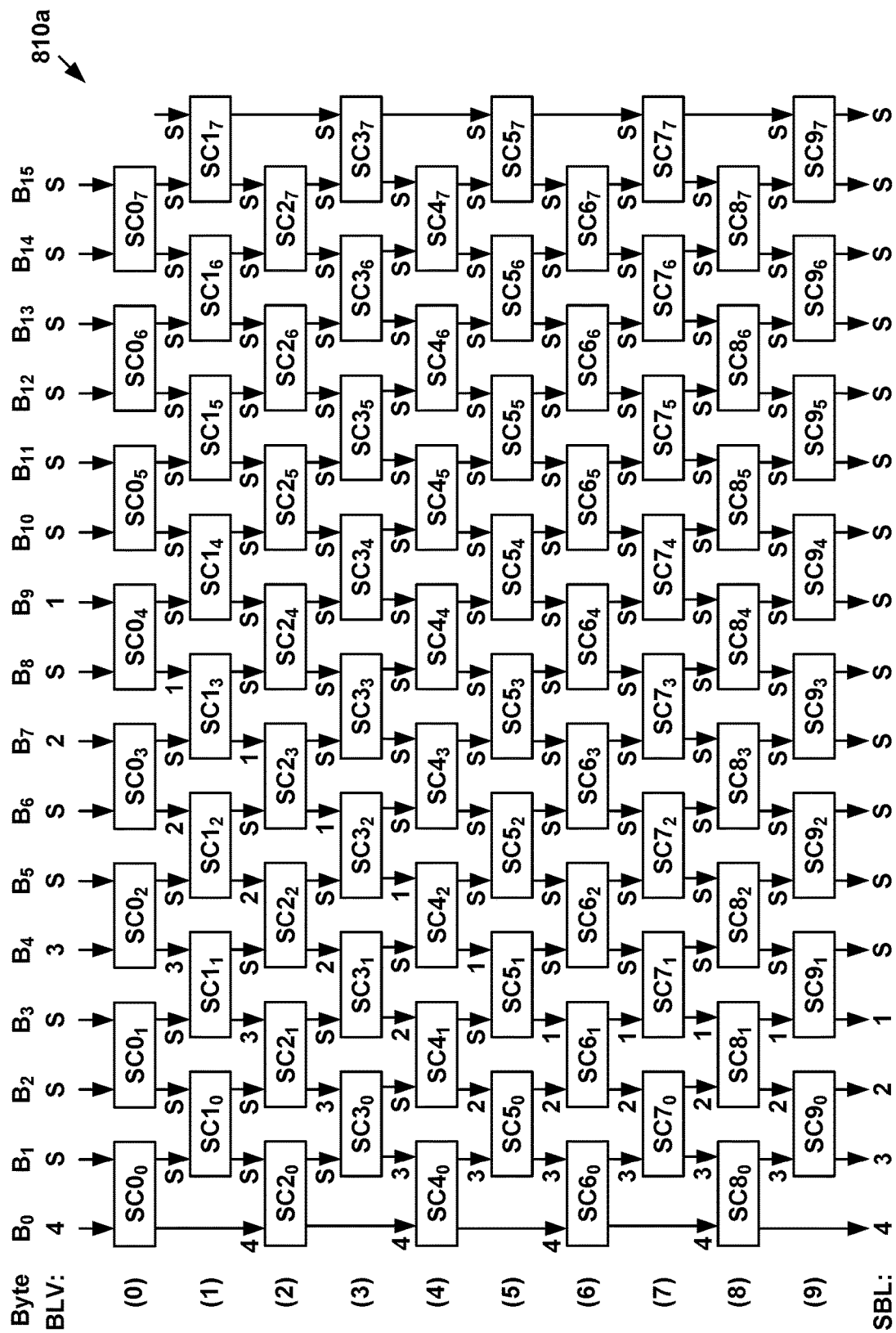
FIG. 8C is a diagram depicting a specific embodiment of the example hardware skip filter of FIG. 8B.

FIG. 8C is a diagram depicting an example skip filter 810a (an embodiment of skip filter 810 of FIG. 8B with N=4) using the example byte length values of FIG. 6. With N=4, skip filter 810a includes an array of [3(N−1)+1]=10 rows and 2N=8 columns of swap circuits $SC0_0$, $SC0_1$, $SC0_2$, ..., $SC9_7$, with each swap circuit being an instance of example swap circuit 800 of FIG. 8A. Skip filter 810a is configured to filter S byte length values from a stream of byte length values to provide symbol byte lengths for N=4 symbols.

As described above, each UTF-8 encoded symbol may include up to 4 bytes, and thus 4 symbols may include up to 16 bytes. Accordingly, skip filter 810 includes 16 inputs for receiving associated byte length values $BLV_0$, $BLV_1$, $BLV_2$, ..., $BLV_{15}$ for bytes $B_0$, $B_1$, $B_2$, ..., $B_{15}$, respectively. In an embodiment, where fewer than 16 byte length values are received, all remaining byte length values are assigned a value of S. In the example of FIG. 6, symbols ◉ Ẋ § @ are encoded in 10 bytes $B_0$, $B_1$, ..., $B_9$, and have the following associated byte length values:

| $BLV_0$ | $BLV_1$ | $BLV_2$ | $BLV_3$ | $BLV_4$ | $BLV_5$ | $BLV_6$ | $BLV_7$ | $BLV_8$ | $BLV_9$ |
|---|---|---|---|---|---|---|---|---|---|
| 4 | S | S | S | 3 | S | S | 2 | S | 1 |

Thus, in FIG. 8C, byte length values $BLV_{10}$-$BLV_{15}$ are all assigned a value of S.

Each of the 10 rows of swap circuits $SC0_0$, $SC0_1$, $SC0_2$, ..., $SC9_7$ performs a swap iteration, such as described above. In particular, swap circuits $SC0_0$, $SC0_1$, $SC0_2$, ..., $SC0_7$ perform swap iteration 0, swap circuits $SC1_0$, $SC1_1$, $SC1_2$, ..., $SC1_7$ perform swap iteration 1, swap circuits $SC2_0$, $SC2_1$, $SC2_2$, ..., $SC2_7$ perform swap iteration 2, ..., and swap circuits $SC9_0$, $SC9_1$, $SC9_2$, ..., $SC9_7$ perform swap iteration 9. Swap circuits $SC9_0$, $SC9_1$, $SC9_2$, ..., $SC9_7$ output UTF-8 encoded symbol byte lengths $SBL_0$, $SBL_1$, $SBL_2$, ..., $SBL_{15}$, respectively. The first N=4 symbol byte lengths $SBL_0$=4, $SBL_1$=3, $SBL_2$=2, $SBL_3$=1 constitute the UTF-8 symbol byte lengths for symbols ◉ Ẋ § @, respectively.

As described above, UTF-16 encodes symbols using one or two word code units (i.e., two bytes or four bytes). UTF-16 encoded symbols have the format shown below in Table 6:

TABLE 6

| Symbol Word/ Byte Length | First Word | Second Word |
|---|---|---|
| 1 word/2 bytes | Not (110110yy_yyyyyyyy) | |
| 2 words/4 bytes | 110110yy_yyyyyyyy | 110111yy_yyyyyyyy | where the "y" characters are replaced by the bits of the code corresponding to a particular symbol.

Because each UTF-16 code unit includes two 8-bit bytes, the order of the bytes may depend on the "endianness" (byte order) of the computer architecture used to encode the data. A single code unit can be stored as "big endian" (most significant bits first) or "little endian" (least significant bits first). To assist in recognizing the byte order of code units, UTF-16 allows a Byte Order Mark (BOM) which indicates the byte order of the UTF-16 code units to precede the first actual coded value.

In the remainder of this discussion, the byte order for all UTF-16 code units is assumed to be big endian. Persons of ordinary skill in the art will understand that in practice the byte order for UTF-16 encoded symbols should be checked and byte swapping may be needed to convert the byte order to big endian for use with the hardware circuits described herein.

In addition, persons of ordinary skill in the art will understand that the hardware circuits described herein alternatively can be configured in accordance with the byte order for all UTF-16 code units is assumed to be little endian, and byte swapping may be needed to convert the byte order to little endian for use with such alternative hardware circuits.

As seen from Table 6, the symbol byte length for a UTF-16 encoded symbol may be determined from the upper 6 bits (15:10) of each word, and thus each word will have an associated symbol byte length. In particular, if bits 15:10 of a word equal 110110 the symbol byte length associated with the word is 4 bytes. Otherwise, the symbol byte length associated with the word is 2 bytes. For two-word UTF-16 encoded symbols, bits 15:10 of the second word equal 110111. In an embodiment, the symbol byte length associated with the second word of two-word UTF-16 encoded symbols is "S" to indicate that the word includes Skip Bytes. Other values may be used for the symbol byte length associated with words that include Skip Bytes.

For example, the UTF-16 encoding of symbols @, § , Ẋ, ◉ is shown in Table 7:

TABLE 7

| Symbol | Encoded Word/ Byte Length | 1st Word | 2nd Word |
|---|---|---|---|
| @ | 1 word/2 bytes | 00000000_01000000 | |
| § | 1 word/2 bytes | 00000000_00111100 | |
| Ẋ | 1 word/2 bytes | 00011110_10001010 | |
| ◉ | 2 words/4 bytes | 11011000_00111100 | 11011100_00011001 |

For example, as shown above symbol ◉ is encoded in 2 words/4 bytes. Bits 15:10 of the first word equal 110110 and thus the symbol byte length associated with the first word is 4. Bits 15:10 of the second word equal 110111 and thus the symbol byte length associated with the second word is S.

Thus, the second word includes Skip Bytes. Each of symbols Ẋ, § and @ is encoded in 1 word/2 bytes. For each of these symbols, bits 15:10 of the first word do not equal 110110 and thus the symbol byte length associated with the first word is 2 bytes.

Referring again to Table 6, each word of a UTF-16 encoded symbol is either a first word that includes information that may be used to determine a symbol byte length of an associated encoded symbol, or a second word that includes Skip Bytes that do not include such symbol byte length information. In an embodiment, each word of a UTF-16 encoded symbol has an associated byte length value that may be identified based on presence or absence of predetermined bit patterns in each word.

In an embodiment, each word of a UTF-16 encoded symbol has an associated byte length value based on the values of bits 15-10 of the word, as described above. In an embodiment, each first word has an associated byte length value of 2 or 4, and each second word has an associated byte length value of S. Thus, if a word of a UTF-16 encoded symbol has an associated byte length value of 2 or 4, the symbol byte length of the encoded symbol equals the byte length value associated with the word. If a word of a UTF-16 encoded symbol has an associated byte length value of S, the word includes Skip Bytes and does not include symbol byte length information of the encoded symbol.

Figure 9:
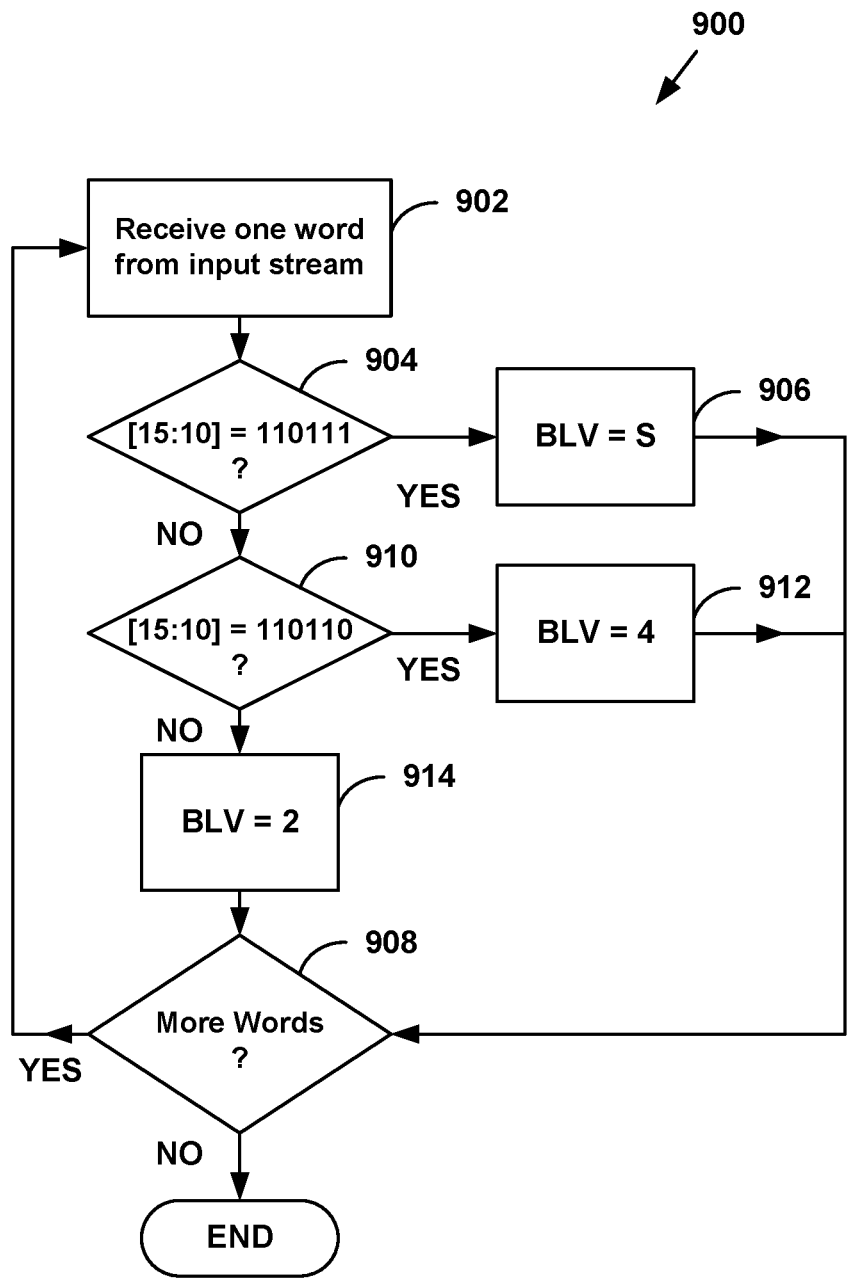
FIG. 9 is a flowchart describing an embodiment of a process for determining byte length values for a UTF-16 encoded symbol stream.

FIG. 9 is a flowchart describing an embodiment of a process 900 for determining byte length values for a UTF-16 encoded symbol stream. In an example embodiment, process 900 is performed on memory die 106 (FIG. 1) using the control circuits discussed above. For example, process 900 can be performed at the direction of state machine 216 (FIG. 2). In another example embodiment, process 900 is performed on controller 104 (FIG. 1).

At step 902, a word of data is received from an input stream of UTF-16 encoded symbols. For example, the input stream may be a stream of data read from memory die 106 (FIG. 1), or other source of input data.

At step 904, a determination is made whether bits 15-10 of the received word equal 110111. If yes, the word includes Skip Bytes and at step 906 the associated byte length value of the word is set to S. Process 900 then proceeds to step 908 to determine if there are any additional words to evaluate. If yes, process 900 returns to step 902 to receive the next word. If at step 908 a determination is made that there are no additional words to evaluate process 900 terminates.

If at step 904 a determination is made that bits 15-10 of the received word do not equal 110111, then at step 910 a determination is made whether bits 15-10 of the received word equals 110110. If yes, at step 912 the associated byte length value of the word is set to 4. Process 900 then proceeds to step 908 to determine if there are any additional words to evaluate. If yes, process 900 returns to step 902 to receive the next word. If at step 908 a determination is made that there are no additional words to evaluate process 900 terminates.

If at step 910 a determination is made that bits 15-10 of the received word do not equal 110110, then at step 914 the associated byte length value of the word is set to 2. Process 900 then proceeds to step 908 to determine if there are any additional words to evaluate. If yes, process 900 returns to step 902 to receive the next word. If at step 908 a determination is made that there are no additional words to evaluate process 900 terminates. Persons of ordinary skill in the art will understand that the order of steps of process 900 may be changed.

Figure 10:
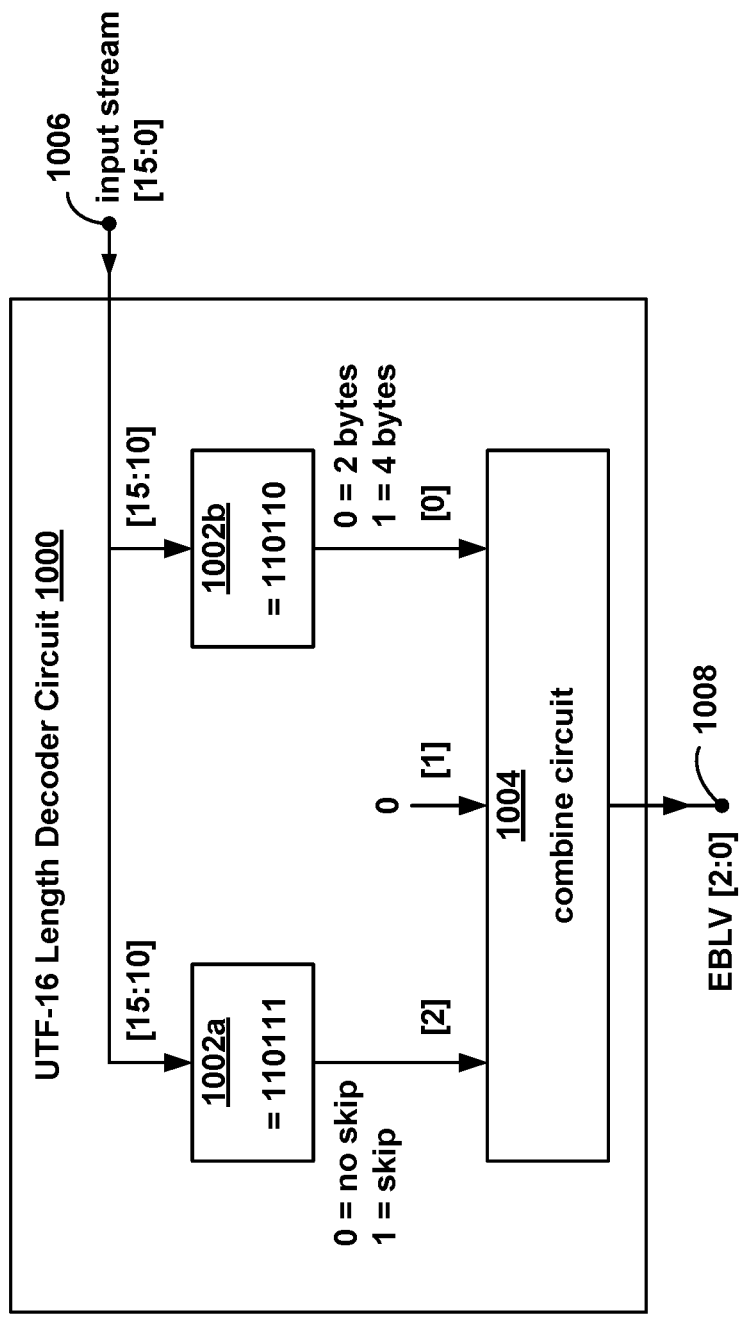
FIG. 10 is a diagram of an embodiment of a hardware circuit for determining byte length values of UTF-16 encoded symbols.

FIG. 10 is a diagram of an embodiment of a hardware circuit (UTF-16 Length Decoder Circuit 1000) for determining byte length values of UTF-16 encoded symbols. In an embodiment, UTF-16 Length Decoder Circuit 1000 may be implemented on one or more memory die 106 (FIG. 1), controller 104 (FIG. 1), or a combination thereof. In an embodiment, UTF 16 Length Decoder Circuit 1000 may be implemented in regular expression filter circuits 222 (FIG. 2). In other embodiments, UTF-16 Length Decoder Circuit 1000 may be implemented in other hardware circuits included in or coupled to memory system 100 (FIG. 1).

UTF-16 Length Decoder Circuit 1000 receives input data one word (2 bytes) at a time from an input stream at an input terminal 1006, determines an associated byte length value for each received input word, and outputs at an output terminal 1008 an encoded byte length value EBLV corresponding to the determined byte length value for each received input word.

UTF-16 Length Decoder Circuit 1000 includes compare circuits 1002a and 1002b, and a combine circuit 1004. Each of compare circuits 1002a and 1002b has an input terminal coupled to input terminal 1006, and provides a single bit output value (0 or 1) to combine circuit 1004 for each received input word. In an embodiment, compare circuits 1002a and 1002b determine the byte length value associated with each received input word.

In particular, compare circuit 1002a compares bits 15-10 of the received input word with the 6-bit binary value "110111" (corresponding to step 904 in process 900 of FIG. 9). If bits 15-10=110111, compare circuit 1002a provides an output of 1 (indicating that the received input word has an associated byte length value of S). Otherwise, compare circuit 1002a provides an output of 0 if bits 15-10≠110111.

Compare circuit 1002b compares bits 15-10 of the received input word with the 6-bit binary value "110110" (corresponding to step 910 in process 900 of FIG. 9). If bits 15-10=110110, compare circuit 1002b provides an output of 1 (indicating that the received input word has an associated byte length value of 4 bytes). Otherwise, compare circuit 1002b provides an output of 0 if bits 15-10≠110110 (indicating that the received input word has an associated byte length value of 2 bytes).

Combine circuit 1004 receives as inputs the output of compare circuit 1002a, the fixed value 0, and the output of compare circuit 1002b, provides at output terminal 1008 an encoded byte length value EBLV corresponding to the determined byte length value associated with each received input word.

In an embodiment, the encoded byte length value EBLV is a 3-bit signal, with the 1-bit output of compare circuit 1002a forming bit 2, the fixed value 0 forming bit 1, and the 1-bit output of compare circuit 1002b forming bit 0 of the encoded byte length value EBLV. Table 8, below, depicts example encoded byte length values for UTF-16 Length Decoder Circuit 1000:

TABLE 8

| Encoded Byte Length Value | Byte Length Value |
| --- | --- |
| 000 | 2 |
| 001 | 4 |
| 100 | S |

In this embodiment, a byte length value of 2 is encoded as 000, a byte length value of 4 is encoded as 001, and a byte length value of S is encoded as 100. Persons of ordinary skill in the art will understand that other byte length value encodings may be used.

FIG. 11 is a diagram depicting an example word stream of UTF-16 encoded symbols ◉ Ẋ § @. As described above and depicted in Table 7, symbol ◉ has a UTF-16 symbol byte length of 4 bytes, symbol Ẋ has a UTF-16 symbol byte length of 2 bytes, symbol § has a UTF-16 symbol byte length of 2 bytes, and symbol @ has a UTF-16 symbol byte length of 2 bytes. Thus, the example UTF-16 word stream includes a total of 10 bytes/5 words $W_0, W_1, W_2, W_3, W_4$.

The example UTF-16 byte stream of FIG. 11 may be applied as the input to UTF-16 Length Decoder Circuit 1000 of FIG. 10. The table depicted in FIG. 11 illustrates the corresponding outputs of compare circuits 1002a and 1002b, and the associated byte length value and encoded byte length value EBLV for each received input word.

In particular, word $W_0$ (11011000 00111100) is the first word of the encoded symbol ◉. The outputs of compare circuits 1002a and 1002b are 01, which corresponds to an associated byte length value BLV=4. Accordingly, for word $W_0$ combine circuit 1004 provides an encoded byte length value EBLV=001.

Word $W_1$ (11011100 00000100) is the second word of the encoded symbol ◉. The outputs of compare circuits 1002a and 1002b are 10, which corresponds to an associated byte length value BLV=S. Accordingly, for word $W_1$ combine circuit 1004 provides an encoded byte length value EBLV=100.

Word $W_2$ (00011110 10001010) is the first (and only) word of the encoded symbol Ẋ. The outputs of compare circuits 1002a and 1002b are 00, which corresponds to an associated byte length value BLV=2. Accordingly, for word $W_2$ combine circuit 1004 provides an encoded byte length value EBLV=000.

Word $W_3$ (00000000 00111100) is the first (and only) word of the encoded symbol §. The outputs of compare circuits 1002a and 1002b are 00, which corresponds to an associated byte length value BLV=2. Accordingly, for word $W_3$ combine circuit 1004 provides an encoded byte length value EBLV=000.

Word $W_4$ (00000000 01000000) is the first (and only) word of the encoded symbol @. The outputs of compare circuits 1002a and 1002b are 00, which corresponds to an associated byte length value BLV=2. Accordingly, for word $W_4$ combine circuit 1004 provides an encoded byte length value EBLV=000.

Thus, as depicted in FIG. 11, the associated byte length values for words $W_0, W_1, W_2, W_3, W_4$ are 4, S, 2, 2, 2, respectively. As described above, Skip Bytes do not include symbol byte length information. Symbol byte lengths for the encoded symbols may be obtained by filtering the S byte length values from the stream of byte length values determined by UTF-16 Length Decoder Circuit 1000. Thus, in this example the UTF-16 symbol byte lengths for encoded symbols ◉, Ẋ, §, @ are 4, 2, 2, 2, respectively.

Figure 12A:
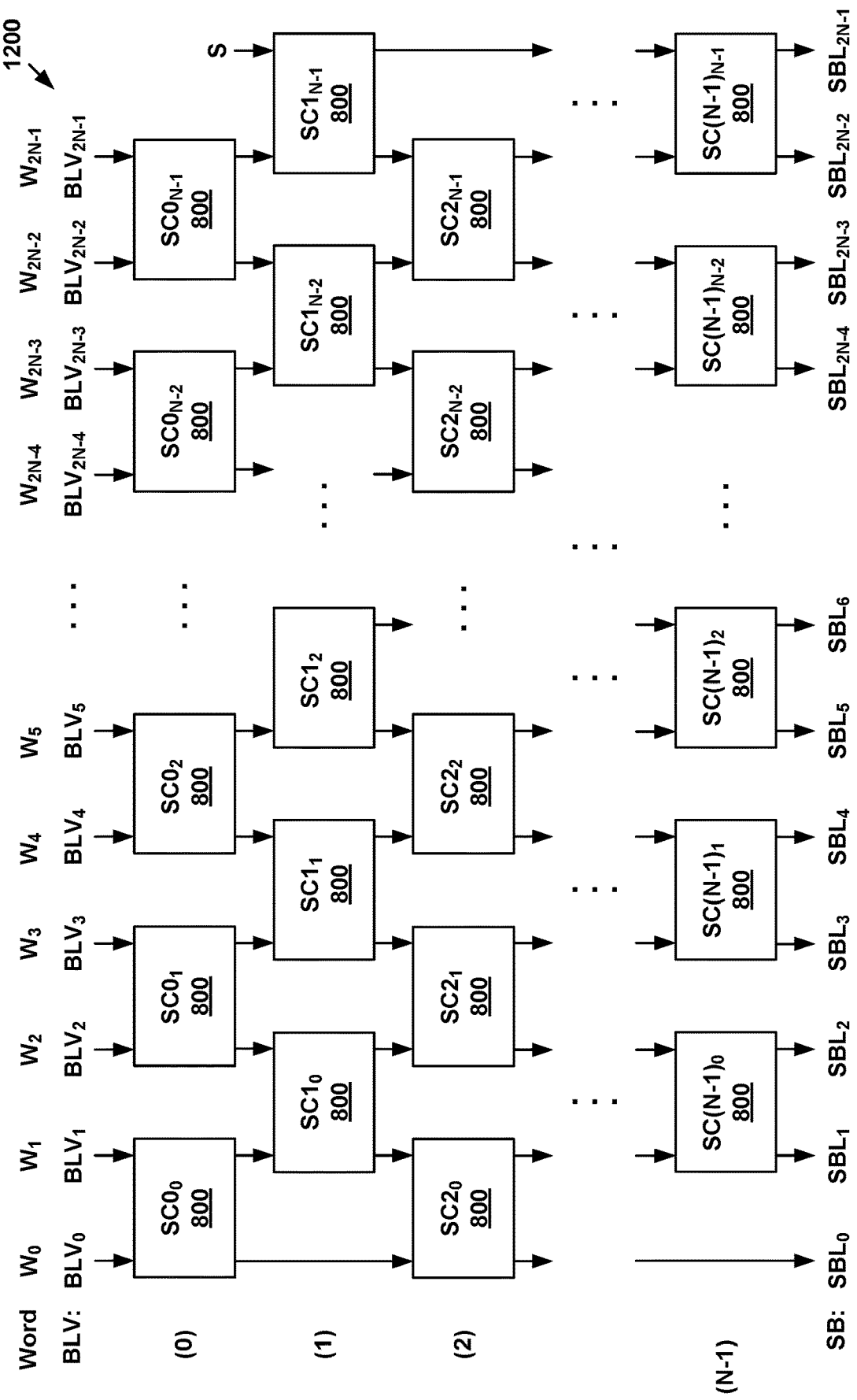
FIG. 12A is a diagram depicting an example hardware skip filter.

FIG. 12A is a diagram depicting an example hardware skip filter 1200 for filtering S byte length values from a stream of byte length values determined by UTF-16 Length Decoder Circuit 1000. In particular, skip filter 1200 is configured to filter S byte length values from a stream of byte length values to provide symbol byte lengths for N symbols. Skip filter 1200 includes an array of N rows and N columns of swap circuits $SC0_0, SC0_1, SC0_2, \ldots, SC(N-1)_{N-1}$, with each swap circuit being an instance of example swap circuit 800 of FIG. 8A.

As described above, each UTF-16 encoded symbol may include up to 2 words, and thus N symbols may include up to 2N words. Accordingly, skip filter 1200 includes 2N inputs for receiving associated byte length values $BLV_0, BLV_1, BLV_2, \ldots, BLV_{2N-1}$ for words $W_0, W_1, W_2, \ldots, W_{2N-1}$, respectively. In an embodiment, if fewer than 2N byte length values are received, all remaining byte length values are assigned a value of S.

In an embodiment, each of the N rows of swap circuits $SC0_0, SC0_1, SC0_2, \ldots SC(N-1)_{N-1}$ performs a swap iteration, such as described above. In particular, swap circuits $SC0_0, SC0_1, SC0_2, \ldots, SC0_{N-1}$ perform swap iteration 0, swap circuits $SC1_0, SC1_1, SC1_2, \ldots, SC1_{N-1}$ perform swap iteration 1, swap circuits $SC2_0, SC2_1, SC2_2, \ldots, SC2_{N-1}$ perform swap iteration 2, . . . , and swap circuits $SC(N-1)_0, SC(N-1)_1, SC(N-1)_2, \ldots, SC(N-1)_{N-1}$ perform swap iteration (N-1). Swap circuits $SC(N-1)_0, SC(N-1)_1, SC(N-1)_2, \ldots, SC(N-1)_{N-1}$ output UTF-16 symbol byte lengths $SBL_0, SBL_1, SBL_2, \ldots, SBL_{2N-1}$, respectively. The first N symbol byte lengths $SBL_0, SBL_1, \ldots SBL_{N-1}$ constitute the symbol byte lengths for the N UTF-16 encoded symbols in the byte stream.

Figure 12B:
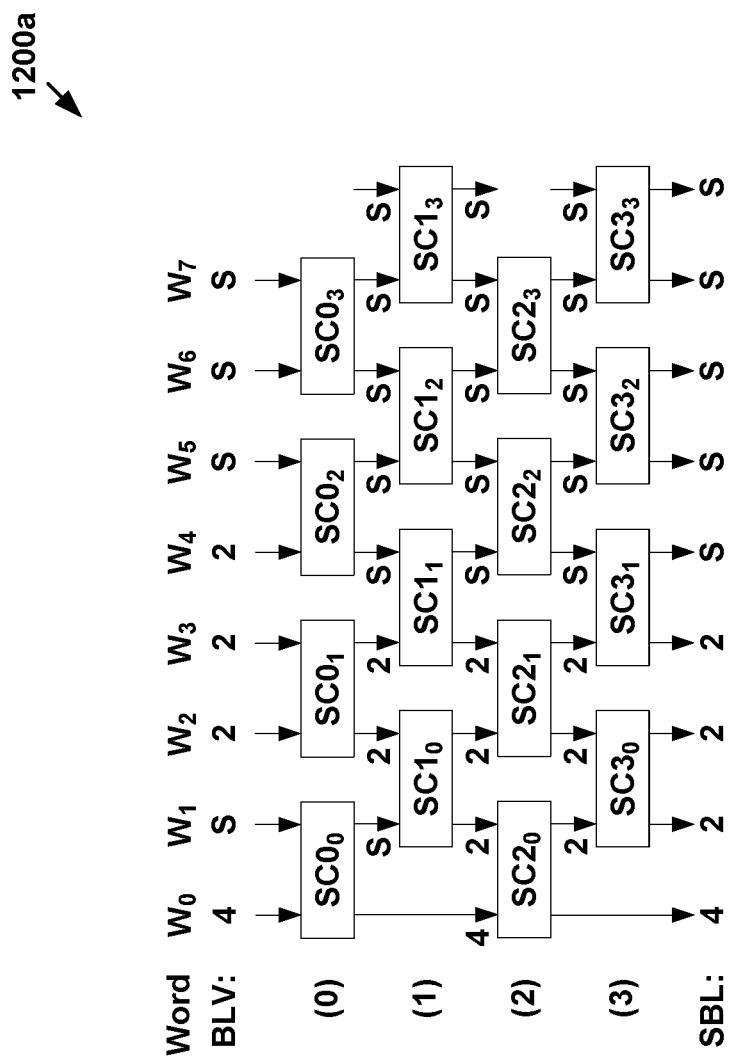
FIG. 12B is a diagram depicting a specific embodiment of the example hardware skip filter of FIG. 12A.

FIG. 12B is a diagram depicting an example skip filter 1200a (an embodiment of skip filter 1200 of FIG. 12A with N=4) using the example byte length values of FIG. 11. With N=4, skip filter 1200a includes an array of N=4 rows and N=4 columns of swap circuits $SC0_0, SC0_1, SC0_2, \ldots, SC3_3$, with each swap circuit being an instance of example swap circuit 800 of FIG. 8A. Skip filter 1200a is configured to filter S byte length values from a stream of byte length values to provide symbol byte lengths for N=4 symbols.

As described above, each UTF-16 encoded symbol may include up to 2 words, and thus 4 symbols may include up to 8 words. Accordingly, skip filter 1200 includes 8 inputs for receiving associated byte length values $BLV_0, BLV_1, BLV_2, \ldots, BLV_7$ for words $W_0, W_1, W_2, \ldots, W_7$, respectively. In an embodiment, if fewer than 8 byte length values are received, all remaining byte length values are assigned a value of S. In the example of FIG. 11, symbols ◉ Ẋ § @ are encoded in 5 words $W_0, W_1, \ldots, W_4$, and have the following byte length values:

| $BLV_0$ | $BLV_1$ | $BLV_2$ | $BLV_3$ | $BLV_4$ |
| --- | --- | --- | --- | --- |
| 4 | S | 2 | 2 | 2 |

Thus, in FIG. 12B, byte length values $BLV_5$-$BLV_7$ are assigned a value of S.

Each of the 4 rows of swap circuits $SC0_0, SC0_1, SC0_2, \ldots, SC3_3$ performs a swap iteration, such as described above. In particular, swap circuits $SC0_0, SC0_1, SC0_2, SC0_2, SC0_3$ perform swap iteration 0, swap circuits $SC1_0, SC1i, SC1_2, SC1_3$ perform swap iteration 1, swap circuits $SC2_0, SC2_1, SC2_2, SC2_3$ perform swap iteration 2, and swap circuits $SC3_0, SC3_1, SC3_2, SC3_3$ perform swap iteration 3. Swap circuits $SC3_0, SC3_1, SC3_2, SC3_3$ output UTF-16 symbol byte lengths $SBL_0, SBL_1, SBL_2, \ldots, SBL_7$, respectively. The first N=4 symbol byte lengths $SBL_0=4$, $SBL_1=2, SBL_2=2, SBL_3=2$ constitute the UTF 16 symbol byte lengths for symbols ◉ Ẋ § @, respectively.

Figure 13A:
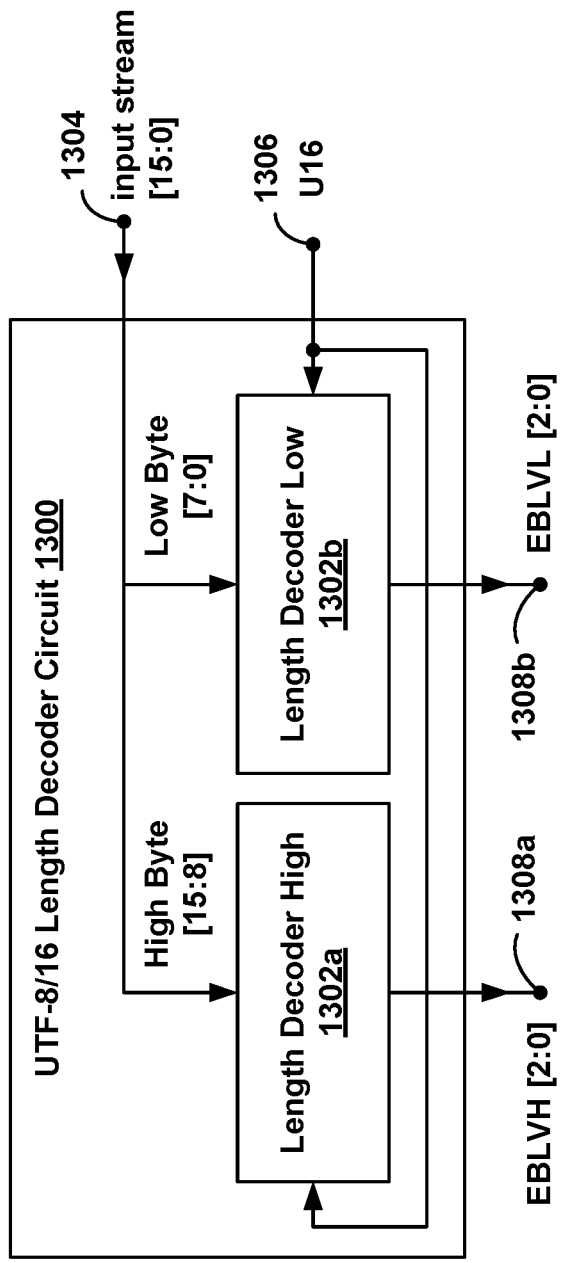
FIG. 13A is a diagram of an embodiment of a hardware circuit for determining byte length values of both UTF-8 and UTF-16 encoded symbols.

FIG. 13A is a diagram of an embodiment of a hardware circuit (UTF-8/16 Length Decoder Circuit 1300) for determining byte length values of both UTF-8 and UTF-16 encoded symbols. In an embodiment, UTF-8/16 Length Decoder Circuit 1300 includes a first circuit (UTF-8/16 Length Decoder High Circuit 1302a), and a second circuit (UTF-8/16 Length Decoder Low Circuit 1302b).

In an embodiment, UTF-8/16 Length Decoder Circuit 1300 may be implemented on one or more memory die 106 (FIG. 1), controller 104 (FIG. 1), or a combination thereof. In an embodiment, UTF-8/16 Length Decoder Circuit 1300 may be implemented in regular expression filter circuits 222 (FIG. 2). In other embodiments, UTF-8/16 Length Decoder Circuit 1300 may be implemented in other hardware circuits included in or coupled to memory system 100 (FIG. 1).

In an embodiment, UTF-8/16 Length Decoder Circuit 1300 receives input data one word (2 bytes) at a time from an input stream at a first input terminal 1304, and receives a one bit binary input signal U16 at a second input terminal 1306. Input signal U16 indicates whether the received input data are UTF-16 encoded data (e.g., U16=1 if the received input data are UTF-16 encoded data, and U16=0 if the received input data are UTF-8 encoded data). Each input data word includes a first byte (bits 15-8), also referred to herein as a "High Byte," and a second byte (bits 7-0), also referred to herein as a "Low Byte."

In an embodiment, UTF-8/16 Length Decoder High Circuit 1302a determines an associated first byte length value (BLVH) for each received input word, and outputs at a first output terminal 1308a a first encoded byte length value (EBLVH) corresponding to the determined first byte length value.

In an embodiment, UTF-8/16 Length Decoder Low Circuit 1302b determines an associated second byte length value (BLVL) for each received input word, and outputs at a second output terminal 1308b a second encoded byte length value (EBLVL) corresponding to the determined second byte length value.

In an embodiment, if the input data are UTF-8 encoded data, first byte length value BLVH is the associated byte length value of the received High Byte, and second byte length value BLVL is the associated byte length value of the received Low Byte. In an embodiment, if the input data are UTF-16 encoded data, first byte length value BLVH is the associated byte length value of the received input word, and second byte length value BLVL is always S.

Figure 13B:
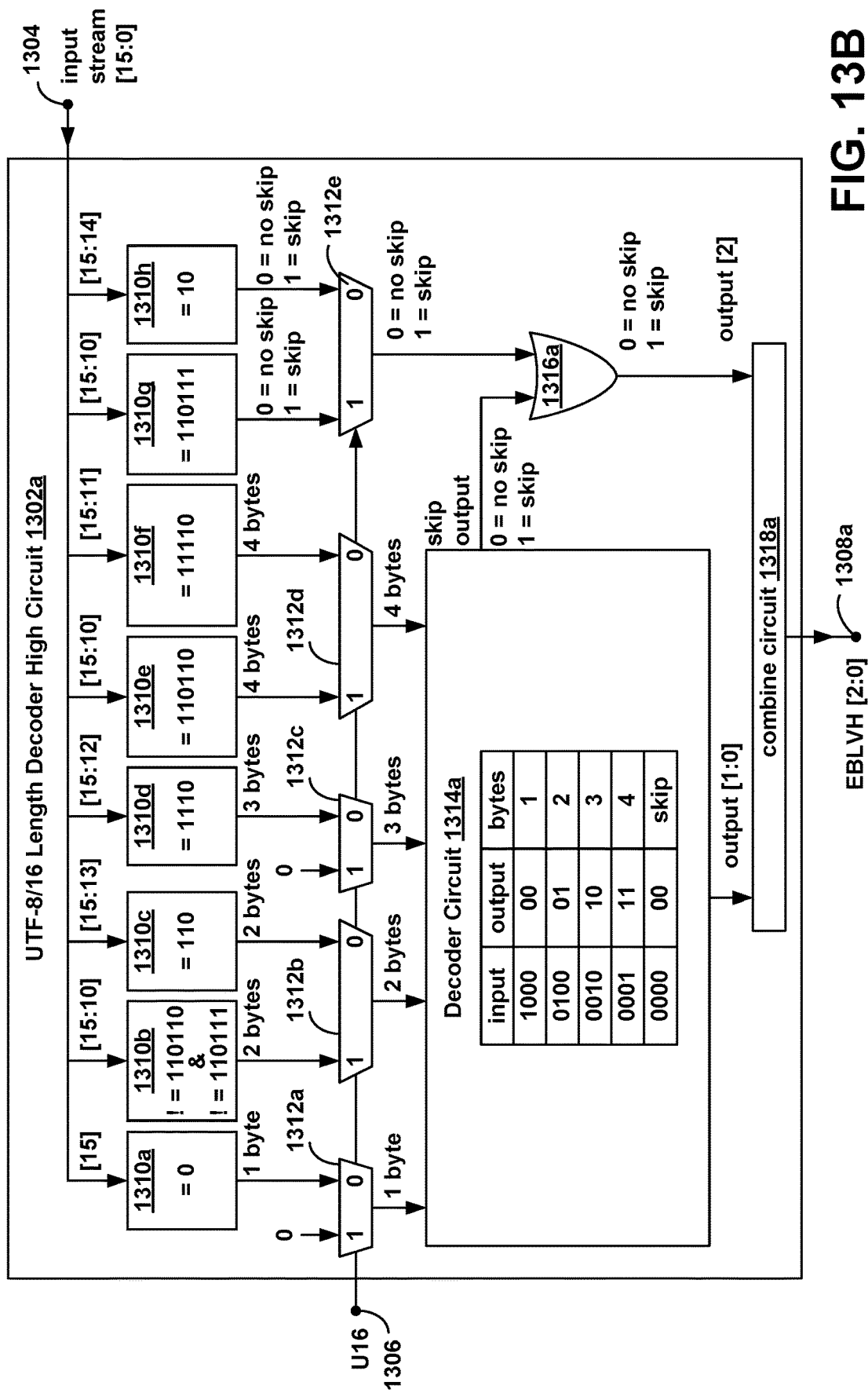
FIG. 13B is a diagram of an embodiment of UTF-8/16 Length Decoder High Circuit of FIG. 13A.

FIG. 13B is a diagram of an embodiment of UTF-8/16 Length Decoder High Circuit 1302a. In an embodiment, UTF-8/16 Length Decoder High Circuit 1302a may be implemented on one or more memory die 106 (FIG. 1), controller 104 (FIG. 1), or a combination thereof. In an embodiment, UTF-8/16 Length Decoder High Circuit 1302a may be implemented in regular expression filter circuits 222 (FIG. 2). In other embodiments, UTF-8/16 Length Decoder High Circuit 1302a may be implemented in other hardware circuits included in or coupled to memory system 100 (FIG. 1). UTF-8/16 Length Decoder High Circuit 1302a includes compare circuits 1310a-1310h, MUX circuits 1312a-1312e, a decoder circuit 1314a, an OR gate 1316a, and a combine circuit 1318a.

Each of compare circuits 1310a-1310h has an input terminal coupled to first input terminal 1304, and provides a single bit output value (0 or 1) to a corresponding one of MUX circuits 1312a-1312e for each received input word. Each of MUX circuits 1312a-1312e has a first (left) input terminal, a second (right) input terminal, a control terminal and an output terminal.

The control terminals of MUX circuits 1312a-1312e are coupled to input signal U16 at second input terminal 1306. If U16=1 (e.g., received input data are UTF-16 encoded data), the first (left) input terminal of each of MUX circuits 1312a-1312e is coupled to the corresponding output terminal of each of MUX circuits 1312a-1312e, respectively. If U16=0 (e.g., received input data are UTF-8 encoded data), the second (right) input terminal of each of MUX circuits 1312a-1312e is coupled to the corresponding output terminal of each of MUX circuits 1312a-1312e, respectively.

In an embodiment, MUX circuits 1312a-1312d selectively couple output signals of compare circuits 1310a-1310f to decoder circuit 1314a based on the value of input signal U16, and MUX circuit 1312e selectively couples output signals of compare circuits 1310g-1310h to OR gate 1316a based on the value of input signal U16.

In particular, if U16=0 (e.g., received input data are UTF-8 encoded data), MUX circuits 1312a-1312d couple output signals of compare circuits 1310a, 1310c, 1310d and 1310f as input signals to decoder circuit 1314a, MUX circuit 1312e couples the output signal of compare circuit 1310h to OR gate 1316a, and compare circuits 1310a, 1310c, 1310d, 1310f and 1310h determine the associated byte length value of the High Byte of each received input word.

If U16=1 (e.g., received input data are UTF-16 encoded data), MUX circuits 1312a-1312d couple output signals of compare circuits 1310b and 1310e as input signals to decoder circuit 1314a, MUX circuit 1312e couples the output signal of compare circuit 1310g to OR gate 1316a, and compare circuits 1310b, 1310e and 1310g determine the associated byte length value of each received input word.

In particular, compare circuit 1310a compares bit 15 of the received input word with the 1-bit binary value "0." If bit 15=0, compare circuit 1310a provides an output of 1 (indicating that the High Byte has an associated byte length value of 1). Otherwise, compare circuit 1310a provides an output of 0 if bit 15≠0.

Compare circuit 1310b compares bits 15-10 of the received input word with two 6-bit binary values "110110" and "110111." If bits 15-10≠110110 and bits 15-10≠110111, compare circuit 1310b provides an output of 1 (indicating that the received input word has an associated byte length value of 2). Otherwise, compare circuit 1310b provides an output of 0 if bits 15-10=110110 or bits 15-10=110111.

Compare circuit 1310c compares bits 15-13 of the received input word with the 3-bit binary value "110." If bits 15-13=110, compare circuit 1310c provides an output of 1 (indicating that the High Byte has an associated byte length value of 2). Otherwise, compare circuit 1310c provides an output of 0 if bits 15-13≠110.

Compare circuit 1310d compares bits 15-12 of the received input word with the 4-bit binary value "1110." If bits 15-12=1110, compare circuit 1310d provides an output of 1 (indicating that the High Byte has an associated byte length value of 3). Otherwise, compare circuit 1310d provides an output of 0 if bits 15-12≠1110.

Compare circuit 1310e compares bits 15-10 of the received input word with the 6-bit binary value "110110." If bits 15-10=110110, compare circuit 1310e provides an output of 1 (indicating that the received input word has an associated byte length value of 4). Otherwise, compare circuit 1310e provides an output of 0 if bits 15-10≠110110.

Compare circuit 1310f compares bits 15-11 of the received input word with the 5-bit binary value "11110." If bits 15-11=11110, compare circuit 1310f provides an output of 1 (indicating that the High Byte has an associated byte length value of 4). Otherwise, compare circuit 1310*f* provides an output of 0 if bits 15-11≠11110.

Compare circuit 1310*g* compares bits 15-10 of the received input word with the 6-bit binary value "110111." If bits 15-10=110111, compare circuit 1310*g* provides an output of 1 (indicating that the received input word has an associated byte length value of S). Otherwise, compare circuit 1310*g* provides an output of 0 if bits 15-10≠110111.

Compare circuit 1310*h* compares bits 15-14 of the received input word with the 2-bit binary value "10." If bits 15-14=10, compare circuit 1310*h* provides an output of 1 (indicating that the High Byte is a Skip Byte, and has an associated byte length value of S). Otherwise, compare circuit 1310*h* provides an output of 0 if bits 15-14≠10.

Decoder circuit 1314*a* receives as a four bit input the 1-bit outputs of MUX circuits 1312*a*-1312*d*, generates a 2-bit decoder output based on the input to decoder circuit 1314*a*, and also generates a 1-bit skip output based on the input to decoder circuit 1314*a*. In an embodiment, the outputs of MUX circuits 1312*a*-1312*d* constitute bits 3-0, respectively, of the input to decoder circuit 1314*a*.

As depicted in FIG. 13B, decoder circuit 1314*a* provides a 2-bit decoder output corresponding to the input to decoder circuit 1314*a*, shown below in Table 9:

TABLE 9

| Decoder Input | Decoder Output | Byte Length Value |
|---|---|---|
| 1000 | 00 | 1 |
| 0100 | 01 | 2 |
| 0010 | 10 | 3 |
| 0001 | 11 | 4 |
| 0000 | 00 | S |

The last row of Table 9 is used for non-resolved encoding in circumstances in which none of compare circuits 1310*a*-1310*d* generate a non-zero output. As described above, such non-resolved encodings are treated as Skip Bytes so that such erroneous symbols are ignored. As depicted in FIG. 13B, decoder circuit 1314*a* provides a 1-bit skip output corresponding to the input to decoder circuit 1314*a*, shown below in Table 10:

TABLE 10

| Decoder Input | Decoder Skip Output |
|---|---|
| 1000 | 0 |
| 0100 | 0 |
| 0010 | 0 |
| 0001 | 0 |
| 0000 | 1 |

The skip output of decoder circuit 1314*a* and the output of MUX circuit 1312*e* are coupled as inputs to OR gate 1316*a*, which provides a 1 bit output to combine circuit 1318*a*. Thus, the output of OR gate 1316*a* equals 1 if either the output of MUX circuit 1312*e* or the skip output of decoder circuit 1314*a* equal 1 (indicating a Skip Byte), and otherwise equals 0.

Combine circuit 1318*a* receives as inputs the output of decoder circuit 1314*a* and the output of OR gate 1316*a*, and provides at first output terminal 1308*a* the first encoded byte length value EBLVH corresponding to the determined first byte length value BLVH for each received input word. As described above, for UTF-8 encoded data, first byte length value BLVH is the associated byte length value of the received High Byte, whereas for UTF-16 encoded data, first byte length value BLVH is the associated byte length value of the received input word.

In an embodiment, the first encoded byte length value EBLVH is a 3-bit signal, with the 2-bit decoder output of decoder circuit 1314*a* forming bits 1 and 0, and the output of OR gate 1316*a* forming bit 2 of the first encoded byte length value EBLVH. Table 11, below, depicts example first encoded byte length values for UTF-8/16 Length Decoder High Circuit 1302*a*:

TABLE 11

| Encoded Byte Length Value High | Byte Length Value High |
|---|---|
| 000 | 1 |
| 001 | 2 |
| 010 | 3 |
| 011 | 4 |
| 100 | S |

In this embodiment, a byte length value of 1 is encoded as 000, a byte length value of 2 is encoded as 001, a byte length value of 3 is encoded as 011, a byte length value of 4 is encoded as 011, and a byte length value of S is encoded as 100. Persons of ordinary skill in the art will understand that other byte length value encodings may be used.

Figure 13C:
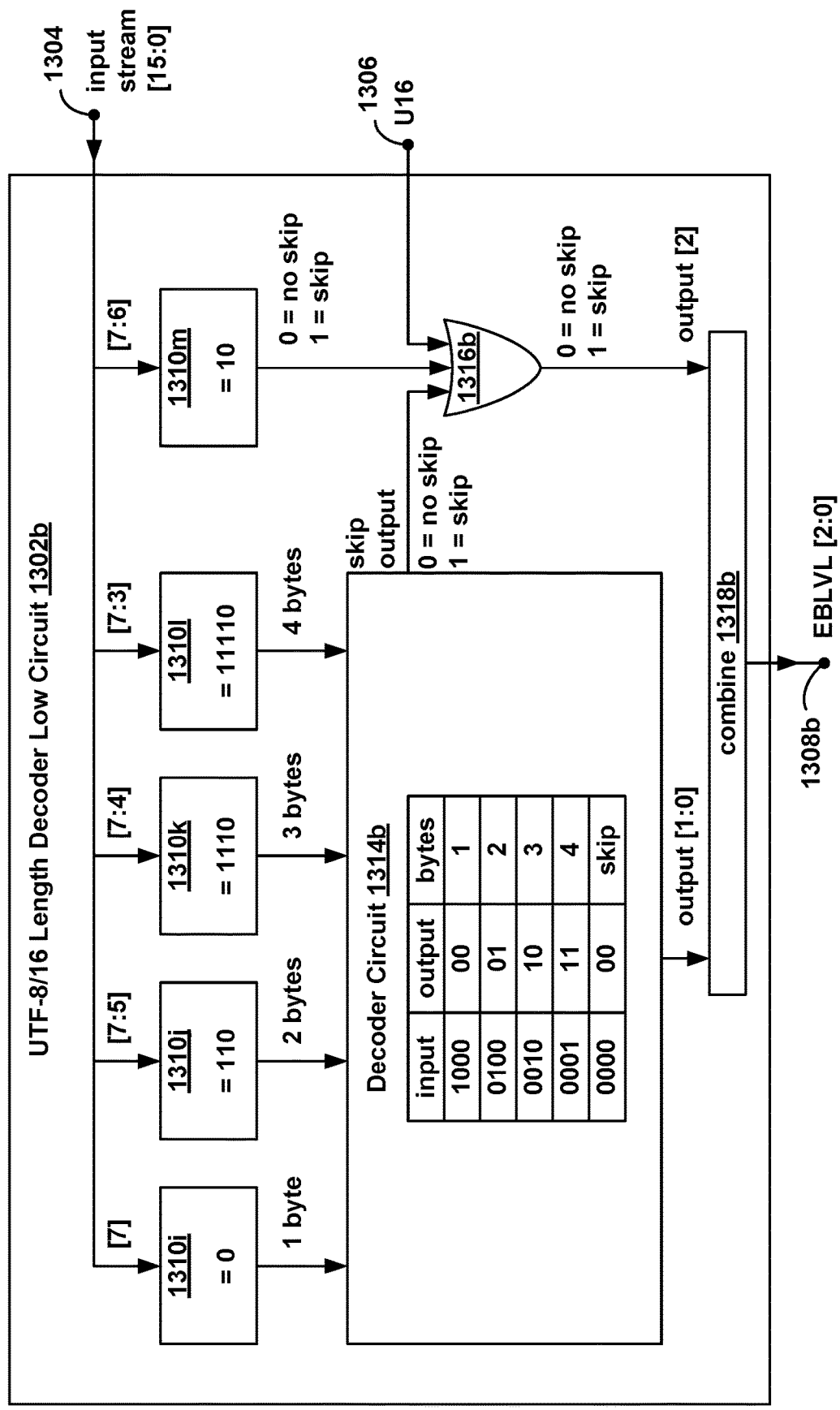
FIG. 13C is a diagram of an embodiment of UTF-8/16 Length Decoder Low Circuit of FIG. 13A.

FIG. 13C is a diagram of an embodiment of UTF-8/16 Length Decoder Low Circuit 1302*b*. In an embodiment, UTF-8/16 Length Decoder Low Circuit 1302*b* may be implemented on one or more memory die 106 (FIG. 1), controller 104 (FIG. 1), or a combination thereof. In an embodiment, UTF-8/16 Length Decoder Low Circuit 1302*b* may be implemented in regular expression filter circuits 222 (FIG. 2). In other embodiments, UTF-8/16 Length Decoder Low Circuit 1302*b* may be implemented in other hardware circuits included in or coupled to memory system 100 (FIG. 1). UTF-8/16 Length Decoder Low Circuit 1302*b* includes compare circuits 1310*i*-1310*m*, a decoder circuit 1314*b*, an OR gate 1316*b*, and a combine circuit 1318*b*.

Each of compare circuits 1310*i*-1310*m* has an input terminal coupled to first input terminal 1304, and provides a single bit output value (0 or 1) to decoder circuit 1314*b* for each received input word. In an embodiment, compare circuits 1310*i*-1310*m* determine the associated byte length value of the Low Byte of each received input word.

In particular, compare circuit 1310*i* compares bit 7 of the received input word with the binary value "0." If bit 7=0, compare circuit 1310*i* provides an output of 1 (indicating that the Low Byte has an associated byte length value of 1 byte). Otherwise, compare circuit 1310*i* provides an output of 0 if bit 7≠0.

Compare circuit 1310*j* compares bits 7-5 of the received input word with the 3-bit binary value "110." If bits 7-5=110, compare circuit 1310*j* provides an output of 1 (indicating that the Low Byte has an associated byte length value of 2 bytes). Otherwise, compare circuit 1310*j* provides an output of 0 if bits 7-5≠110.

Compare circuit 1310*k* compares bits 7-4 of the received input byte with the 4-bit binary value "1110." If bits 7-4=1110, compare circuit 1310*k* provides an output of 1 (indicating that the Low Byte has an associated byte length value of 3 bytes). Otherwise, compare circuit 1310*k* provides an output of 0 if bits 7-4≠1110.

Compare circuit 1310*l* compares bits 7-3 of the received input byte with the 5-bit binary value "11110." If bits 7-3=11110, compare circuit 1310*l* provides an output of 1 (indicating that the Low Byte has an associated byte length value of 4 bytes). Otherwise, if compare circuit 1310*l* provides an output of 0 if bits 7-3≠11110.

Compare circuit 1310*m* compares bits 7-6 of the received input byte with the 2-bit binary value "10." If bits 7-6=10, compare circuit 1310*m* provides an output of 1 (indicating that the Low Byte is a Skip Byte, and has an associated byte length value of S). Otherwise, compare circuit 1310*m* provides an output of 0 if bits 7-6≠10.

Decoder circuit 1314*b* receives as a four bit input the 1-bit outputs of compare circuits 1310*i*-1310*l*, generates a 2-bit decoder output based on the input to decoder circuit 1314*b*, and also generates a 1-bit skip output based on the input to decoder circuit 1314*b*. In an embodiment, the outputs of compare circuits 1310*i*-1310*l* constitute bits 3-0, respectively, of the input to decoder circuit 1314*b*.

As depicted in FIG. 13C, decoder circuit 1314*b* provides a 2-bit decoder output corresponding to the input to decoder circuit 1314*b*, shown below in Table 12:

TABLE 12

| Decoder Input | Decoder Output | Byte Length Value |
|---|---|---|
| 1000 | 00 | 1 |
| 0100 | 01 | 2 |
| 0010 | 10 | 3 |
| 0001 | 11 | 4 |
| 0000 | 00 | S |

The last row of Table 12 is used for non-resolved encoding in circumstances in which none of compare circuits 1310*i*-1310*l* generate a non-zero output. As described above, such non-resolved encodings are treated as Skip Bytes so that such erroneous symbols are ignored. As depicted in FIG. 13C, decoder circuit 1314*b* provides a 1-bit skip output corresponding to the input to decoder circuit 1314*b*, shown below in Table 13:

TABLE 13

| Decoder Input | Decoder Skip Output |
|---|---|
| 1000 | 0 |
| 0100 | 0 |
| 0010 | 0 |
| 0001 | 0 |
| 0000 | 1 |

The skip output of decoder circuit 1314*b*, the output of compare circuit 1310*m*, and input signal U16 are coupled as inputs to OR gate 1316*b*, which provides a 1 bit output to combine circuit 1318*b*. Thus, the output of OR gate 1316*b* equals 1 if any of the output of compare circuit 1310*m*, the skip output of decoder circuit 1314*b*, or input signal U16 have a value 1 (indicating a Skip Byte), and otherwise equals 0.

Combine circuit 1318*b* receives as inputs the output of decoder circuit 1314*b* and the output of OR gate 1316*b*, and provides at second output terminal 1308*b* the second encoded byte length value EBLVL corresponding to the determined second byte length value BLVL for the each received input word. As described above, for UTF-8 encoded data, the second byte length value BLVL is the associated byte length value of the received Low Byte, whereas for UTF-16 encoded data, the second byte length value BLVL is always S.

In an embodiment, the second encoded byte length value EBLVL is a 3-bit signal, with the 2-bit decoder output of decoder circuit 1314*b* forming bits 1 and 0, and the output of OR gate 1316*b* forming bit 2 of the second encoded byte length value EBLVL. Table 14, below, depicts example second encoded byte length values for UTF-8/16 Length Decoder Low Circuit 1302*b*:

TABLE 14

| Encoded Byte Length Value Low | Byte Length Value Low |
|---|---|
| 000 | 1 |
| 001 | 2 |
| 010 | 3 |
| 011 | 4 |
| 100 | S |

In this embodiment, a byte length value of 1 is encoded as 000, a byte length value of 2 is encoded as 001, a byte length value of 3 is encoded as 011, a byte length value of 4 is encoded as 011, and a byte length value of S is encoded as 100. Persons of ordinary skill in the art will understand that other byte length value encodings may be used.

FIG. 14A is a diagram depicting an example word stream of UTF-8 encoded symbols ● Ẍ § @. As described above and depicted in Table 2, symbol ● has a UTF-8 symbol byte length of 4 bytes, symbol Ẍ has a UTF-8 symbol byte length of 3 bytes, symbol § has a symbol byte length of 2 bytes, and symbol @ has a UTF-8 symbol byte length of 1 byte. Thus, the example UTF-8 word stream includes a total of 10 bytes/5 words $W_0$, $W_1$, $W_2$, $W_3$, $W_4$.

The example UTF-8 word stream of FIG. 14A may be applied as the input to UTF-8/16 Length Decoder Circuit 1300 of FIGS. 13A-13C. The received input data are UTF-8 encoded data, and thus U16=0. Referring to FIG. 13B, MUX circuits 1312*a*-1312*d* couple output signals of compare circuits 1310*a*, 1310*c*, 1310*d* and 1310*f* as input signals to decoder circuit 1314*a*, MUX circuit 1312*e* couples the output signal of compare circuit 1310*h* to OR gate 1316*a*, and compare circuits 1310*a*, 1310*c*, 1310*d*, 1310*f* and 1310*h* determine the associated first byte length value BLVH of each received input word. Referring to FIG. 13C, compare circuits 1310*i*-1310*m* determine the associated second byte length value BLVL of each received input word.

The table depicted in FIG. 14A illustrates the corresponding outputs of compare circuits 1310*a*, 1310*c*, 1310*d*, 1310*f* and 1310*h*, and the associated first byte length value BLVH and first encoded byte length value EBLVH of the High Byte of each received input word. FIG. 14A also illustrates the corresponding outputs of compare circuits 1310*i*-1310*m*, and the associated second byte length value BLVL and second encoded byte length value EBLVL of the Low Byte of each received input word.

In particular, word $W_0$ (11110000 10011111) includes the first two bytes of the encoded symbol ●. The High Byte of word $W_0$ is 11110000. The outputs of compare circuits

1310*a*, 1310*c*, 1310*d*, 1310*f* (and corresponding MUX circuits 1312*a*-1312*d*, respectively) are 0001, which corresponds to an associated first byte length value BLVH=4. Decoder circuit 1314*a* provides a decoder output of 11, and a skip output of 0. The output of compare circuit 1310*h* (and MUX circuit 1312*e*) is 0, and the output of OR gate 1316*a* is 0. Accordingly, for word $W_0$ combine circuit 1318*a* provides an encoded first byte length value EBLVH=011.

The Low Byte of word $W_0$ is 10011111. The outputs of compare circuits 1310*i*-1310*l* are 0000, which corresponds to an associated second byte length value BLVL=S. Decoder circuit 1314*b* provides a decoder output of 00, and a skip output of 1. The output of compare circuit 1310*m* is 1, and the output of OR gate 1316*b* is 1. Accordingly, for word $W_0$ combine circuit 1318*b* provides an encoded second byte length value EBLVL=100.

Word $W_1$ (10000000 10011001) includes the second two bytes of the encoded symbol ●. The High Byte of word $W_1$ is 10000000. The outputs of compare circuits 1310*a*, 1310*c*, 1310*d*, 1310*f* (and corresponding MUX circuits 1312*a*-1312*d*, respectively) are 0000, which corresponds to an associated first byte length value BLVH=S. Decoder circuit 1314*a* provides a decoder output of 00, and a skip output of 1. The output of compare circuit 1310*h* (and MUX circuit 1312*e*) is 1, and the output of OR gate 1316*a* is 1. Accordingly, for word $W_1$ combine circuit 1318*a* provides an encoded first byte length value EBLVH=100.

The Low Byte of word $W_1$ is 10011001. The outputs of compare circuits 1310*i*-1310*l* are 0000, which corresponds to an associated second byte length value BLVL=S. Decoder circuit 1314*b* provides a decoder output of 00, and a skip output of 1. The output of compare circuit 1310*m* is 1, and the output of OR gate 1316*b* is 1. Accordingly, for word $W_1$ combine circuit 1318*b* provides an encoded second byte length value EBLVL=100.

Word $W_2$ (11100001 10111010) includes the first two bytes of the encoded symbol Ẋ. The High Byte of word $W_2$ is 11100001. The outputs of compare circuits 1310*a*, 1310*c*, 1310*d*, 1310*f* (and corresponding MUX circuits 1312*a*-1312*d*, respectively) are 0010, which corresponds to an associated first byte length value BLVH=3. Decoder circuit 1314*a* provides a decoder output of 10, and a skip output of 0. The output of compare circuit 1310*h* (and MUX circuit 1312*e*) is 0, and the output of OR gate 1316*a* is 0. Accordingly, for word $W_2$ combine circuit 1318*a* provides an encoded first byte length value EBLVH=010.

The Low Byte of word $W_2$ is 10111010. The outputs of compare circuits 1310*i*-1310*l* are 0000, which corresponds to an associated second byte length value BLVL=S. Decoder circuit 1314*b* provides a decoder output of 00, and a skip output of 1. The output of compare circuit 1310*m* is 1, and the output of OR gate 1316*b* is 1. Accordingly, for word $W_2$ combine circuit 1318*b* provides an encoded second byte length value EBLVL=100.

Word $W_3$ (10001010 11000010) includes the third byte of the encoded symbol Ẋ, and the first byte of the encoded symbol §. The High Byte of word $W_3$ is 10001010). The outputs of compare circuits 1310*a*, 1310*c*, 1310*d*, 1310*f* (and corresponding MUX circuits 1312*a*-1312*d*, respectively) are 0000, which corresponds to an associated first byte length value BLVH=S. Decoder circuit 1314*a* provides a decoder output of 00, and a skip output of 1. The output of compare circuit 1310*h* (and MUX circuit 1312*e*) is 1, and the output of OR gate 1316*a* is 1. Accordingly, for word $W_3$ combine circuit 1318*a* provides an encoded first byte length value EBLVH=100.

The Low Byte of word $W_3$ is 11000010. The outputs of compare circuits 1310*i*-1310*l* are 0100, which corresponds to an associated second byte length value BLVL=2. Decoder circuit 1314*b* provides a decoder output of 01, and a skip output of 0. The output of compare circuit 1310*m* is 0, and the output of OR gate 1316*b* is 0. Accordingly, for word $W_3$ combine circuit 1318*b* provides an encoded second byte length value EBLVL=001.

Word $W_4$ (10100111 01000000) includes the second byte of the encoded symbol §, and the first byte of the encoded symbol @. The High Byte of word $W_4$ is 10100111). The outputs of compare circuits 1310*a*, 1310*c*, 1310*d*, 1310*f* (and corresponding MUX circuits 1312*a*-1312*d*, respectively) are 0000, which corresponds to an associated first byte length value BLVH=S. Decoder circuit 1314*a* provides a decoder output of 00, and a skip output of 1. The output of compare circuit 1310*h* (and MUX circuit 1312*e*) is 1, and the output of OR gate 1316*a* is 1. Accordingly, for word $W_4$ combine circuit 1318*a* provides an encoded first byte length value EBLVH 100.

The Low Byte of word $W_4$ is 01000000. The outputs of compare circuits 1310*i*-1310*l* are 1000, which corresponds to an associated second byte length value BLVL=1. Decoder circuit 1314*b* provides a decoder output of 00, and a skip output of 0. The output of compare circuit 1310*m* is 0, and the output of OR gate 1316*b* is 0. Accordingly, for word $W_4$ combine circuit 1318*b* provides an encoded second byte length value EBLVL=000.

Thus, as depicted in FIG. 14A, the associated byte length values for words $W_0$, $W_1$, $W_2$, $W_3$, $W_4$ are 4, S, S, S, 3, S, S, 2, S, 1, respectively. As described above, Skip Bytes do not include symbol byte length information. Symbol byte lengths for the encoded symbols may be obtained by filtering (e.g., using example hardware skip filter 1200 of FIG. 12A, modified to include 2 associated byte length values per word) the S byte length values from the stream of byte length values determined by UTF-8/16 Length Decoder Circuit 1300 of FIGS. 13A-13C. Thus, in this example the UTF-8 symbol byte lengths for encoded symbols ●, Ẋ, §, @ are 4, 3, 2, 1, respectively.

FIG. 14B is a diagram depicting an example word stream of UTF-16 encoded symbols ● Ẋ § @. As described above and depicted in Table 7, symbol ● has a UTF-16 symbol byte length of 4 bytes, symbol Ẋ has a UTF-16 symbol byte length of 2 bytes, symbol § has a UTF-16 symbol byte length of 2 bytes, and symbol @ has a UTF-16 symbol byte length of 2 bytes. Thus, the example UTF-16 word stream includes a total of 5 words $W_0$, $W_1$, $W_2$, $W_3$, $W_4$.

The example UTF-16 byte stream of FIG. 14B may be applied as the input to UTF-8/16 Length Decoder Circuit 1300 of FIGS. 13A-13C. The received input data are UTF-16 encoded data, and thus U16=1. Referring to FIG. 13B, MUX circuit 1312*a* and MUX 1312*c* couple fixed values of 0 as input signals to decoder circuit 1314*a*, MUX circuits 1312*b* and 1312*d* couple output signals of compare circuits 1310*b* and 1310*e*, respectively, as input signals to decoder circuit 1314*a*, MUX circuit 1312*e* couples the output signal of compare circuit 1310*g* to OR gate 1316*a*, and compare circuits 1310*b*, 1310*e* and 1310*g* determine the associated first byte length value BLVH of each received input word.

Referring to FIG. 13C, because U16=1, the output of OR gate 1316*b* is always 1, and the associated second byte length value BLVL=S for each received input word. Thus, for UTF-16 encoded data, the associated second byte length value BLVL and encoded second byte length value EBLVL for each received input word can be ignored.

The table depicted in FIG. 14B illustrates the corresponding outputs of compare circuits 1310*b*, 1310*e* and 1310*g*, and the associated first byte length value BLVH and encoded second byte length value EBLVH for each received input word.

In particular, word $W_0$ (11011000 00111100) is the first word of the encoded symbol ●. The outputs of compare circuits 1310*b* and 1310*e* are 01, which corresponds to an associated first byte length value BLVH=4. Decoder circuit 1314*a* provides a decoder output of 11, and a skip output of 0. The output of compare circuit 1310*g* (and MUX circuit 1312*e*) is 0, and the output of OR gate 1316*a* is 0. Accordingly, for word $W_0$ combine circuit 1318*a* provides an encoded first byte length value EBLVH=011.

Word $W_1$ (11011100 00000100) is the second word of the encoded symbol ●. The outputs of compare circuits 1310*b* and 1310*e* are 00, which corresponds to an associated first byte length value BLVH=S. Decoder circuit 1314*a* provides a decoder output of 00, and a skip output of 1. The output of compare circuit 1310*g* (and MUX circuit 1312*e*) is 1, and the output of OR gate 1316*a* is 1. Accordingly, for word $W_1$ combine circuit 1318*a* provides an encoded first byte length value EBLVH=100.

Word $W_2$ (00011110 10001010) is the first (and only) word of the encoded symbol Ẋ. The outputs of compare circuits 1310*b* and 1310*e* are 10, which corresponds to an associated first byte length value BLVH=2. Decoder circuit 1314*a* provides a decoder output of 01, and a skip output of 0. The output of compare circuit 1310*g* (and MUX circuit 1312*e*) is 0, and the output of OR gate 1316*a* is 0. Accordingly, for word $W_2$ combine circuit 1318*a* provides an encoded first byte length value EBLVH=001.

Word $W_3$ (00000000 00111100) is the first (and only) word of the encoded symbol §. The outputs of compare circuits 1310*b* and 1310*e* are 10, which corresponds to an associated first byte length value BLVH=2. Decoder circuit 1314*a* provides a decoder output of 01, and a skip output of 0. The output of compare circuit 1310*g* (and MUX circuit 1312*e*) is 0, and the output of OR gate 1316*a* is 0. Accordingly, for word $W_3$ combine circuit 1318*a* provides an encoded first byte length value EBLVH=001.

Word $W_4$ (00000000 01000000) is the first (and only) word of the encoded symbol @. The outputs of compare circuits 1310*b* and 1310*e* are 10, which corresponds to an associated first byte length value BLVH=2. Decoder circuit 1314*a* provides a decoder output of 01, and a skip output of 0. The output of compare circuit 1310*g* (and MUX circuit 1312*e*) is 0, and the output of OR gate 1316*a* is 0. Accordingly, for word $W_4$ combine circuit 1318*a* provides an encoded first byte length value EBLVH=001.

Thus, as depicted in FIG. 14B, the corresponding byte length values for words $W_0$, $W_1$, $W_2$, $W_3$, $W_4$ are 4, S, 2, 2, 2, respectively. As described above, Skip Bytes do not include symbol byte length information. Symbol byte lengths for the encoded symbols may be obtained by filtering (e.g., using example hardware skip filter 1200 of FIG. 12A) the S byte length values from the stream of byte length values determined by UTF-8/16 Length Decoder Circuit 1300 of FIGS. 13A-13C. Thus, in this example the UTF-16 symbol byte lengths for encoded symbols ●, Ẋ, §, @ are 4, 2, 2, 2, respectively.

As described above, the example UTF-8/16 Length Decoder Circuit 1300 of FIGS. 13A-13C receives input data one word at a time from an input stream, and determines an associated first byte length value BLVH, a first encoded byte length value EBLVH, an associated second byte length value BLVL and a second encoded byte length value EBLVL for each received input word. In embodiments, multiple UTF-8/16 Length Decoder Circuits 1300 can be combined, with each UTF-8/16 Length Decoder Circuit 1300 processing a corresponding word from an input stream. In an embodiment, multiple UTF-8/16 Length Decoder Circuits 1300 can be combined to determine associated byte length values of N-symbol strings of data.

Figure 15A:
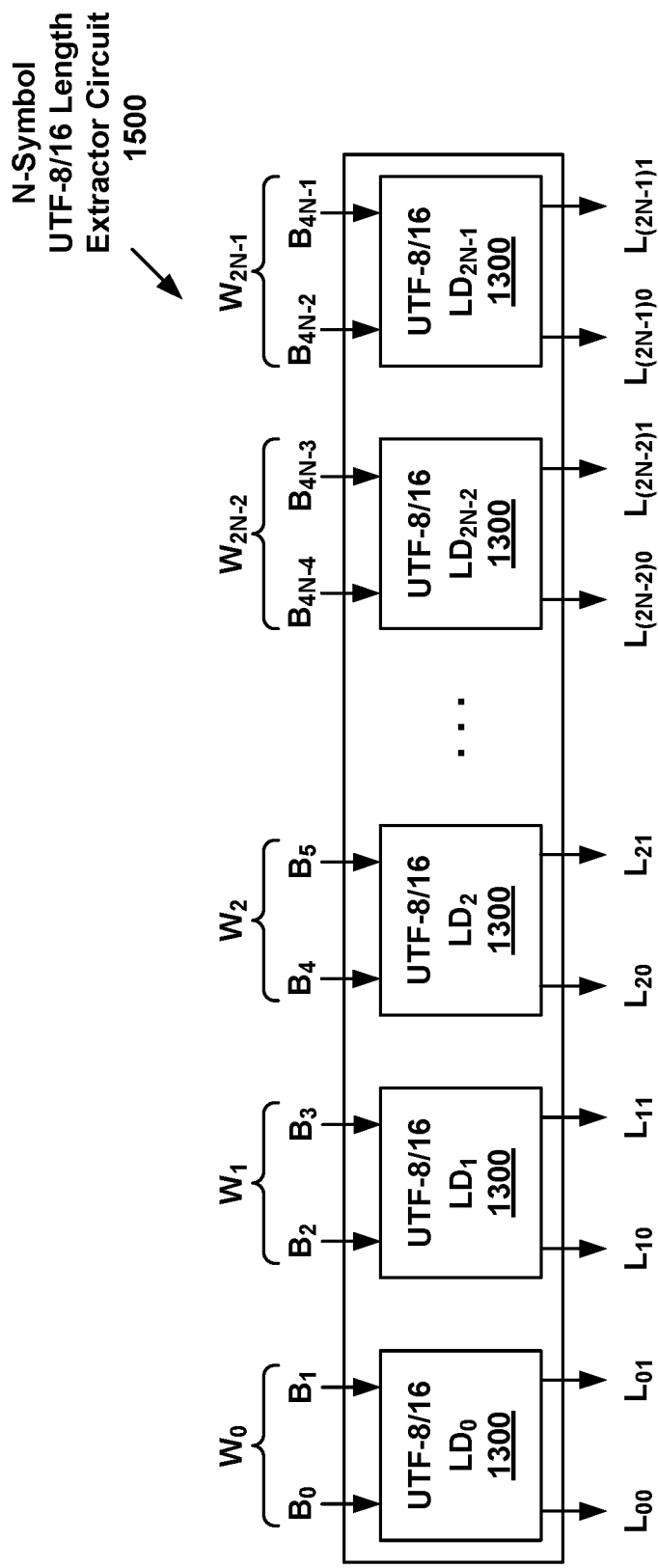
FIG. 15A is a diagram of an embodiment of a hardware circuit for determining associated byte length values of N-symbol strings of UTF-8 or UTF-16 encoded symbols.

For example, FIG. 15A is a diagram of an embodiment of a hardware circuit (N-Symbol UTF-8/16 Length Extractor Circuit 1500) for determining associated byte length values of N-symbol strings of UTF-8 or UTF-16 encoded symbols. In an embodiment, N-Symbol UTF-8/16 Length Extractor Circuit 1500 may be implemented on one or more memory die 106 (FIG. 1), controller 104 (FIG. 1), or a combination thereof. In an embodiment, N-Symbol UTF-8/16 Length Extractor Circuit 1500 may be implemented in regular expression filter circuits 222 (FIG. 2). In other embodiments, N-Symbol UTF-8/16 Length Extractor Circuit 1500 may be implemented in other hardware circuits included in or coupled to memory system 100 (FIG. 1).

Because each UTF-8/16 Length Decoder Circuit 1300 determines associated byte length values for one input word, and because each UTF-8 or UTF-16 encoded symbol may include up to 2 words, N-Symbol UTF-8/16 Length Extractor Circuit 1500 includes 2N Length Decoder Circuits $LD_0$, $LD_1$, $LD_2$, ..., $LD_{2N-2}$, $LD_{2N-1}$, each an instance of UTF-8/16 Length Decoder Circuit 1300 of FIGS. 13A-13C.

Each Length Decoder Circuit $LD_0$, $LD_1$, $LD_2$, ..., $LD_{2N-2}$, $LD_{2N-1}$ receives from an input stream (not shown) corresponding input words $W_0$, $W_1$, $W_2$, ..., $W_{2N-2}$, $W_{2N-1}$, respectively, and also receives input signal U16 (not shown). In an embodiment, input words $W_0$, $W_1$, $W_2$, ..., $W_{2N-2}$, $W_{2N-1}$ are consecutive words in the input stream. For example, the input stream may be a stream of data read from memory die 106 (FIG. 1), or other source of input data. As depicted in FIG. 15A, each input word includes 2 bytes of data. For example, input word $W_0$ includes bytes $B_0$ and $B_1$, input word $W_1$ includes bytes $B_2$ and $B_3$, ..., input word $W_{2N-1}$ includes bytes $B_{4N-2}$ and $B_{4N-1}$.

As described above regarding UTF-8/16 Length Decoder Circuit 1300 of FIGS. 13A-13C, each Length Decoder Circuit $LD_0$, $LD_1$, $LD_2$, ..., $LD_{2N-2}$, $LD_{2N-1}$ determines associated first and second byte length values BLVH and BLVL, respectively, and outputs corresponding first and second encoded byte length values EBLVH and EBLVL, respectively.

To avoid overcrowding the drawing, the associated first and second encoded byte length values EBLVH and EBLVL are designated in FIG. 15A as $L_{x0}$ and $L_{x1}$, respectively, x=0, 1, 2, ..., 2N-1). Thus, N-Symbol UTF-8/16 Length Extractor Circuit 1500 receives 2N input words $W_0$, $W_1$, $W_2$, ..., $W_{2N-2}$, $W_{2N-1}$ (4N input bytes $B_0$, $B_1$, $B_2$, ..., $B_{4N-2}$, $B_{4N-1}$) and generates 2N pairs of encoded byte length values $L_{x0}$ and $L_{x1}$, respectively, x=0, 1, 2, ..., 2N-1.

As in the examples of FIGS. 14A and 14B, symbol byte lengths for N symbols may be obtained by filtering (e.g., using example hardware skip filter 1200 of FIG. 12A) the S byte length values from the stream of byte length values determined by Length Decoder Circuits $LD_0$, $LD_1$, $LD_2$, ..., $LD_{2N-2}$, $LD_{2N-1}$. The first N filtered byte length values constitute the symbol byte lengths for the first N symbols of the input stream.

Figure 15B:
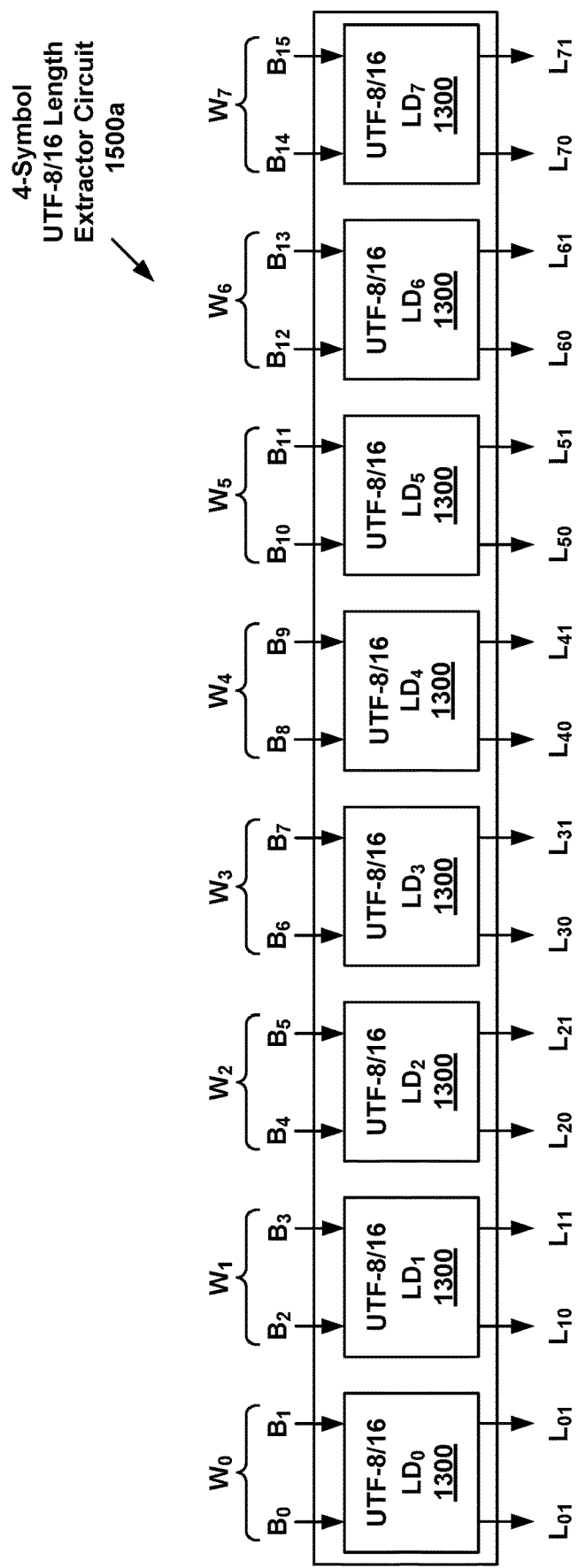
FIG. 15B is a diagram of a specific embodiment of the hardware circuit of FIG. 15A.

FIG. 15B is a diagram depicting an example 4-Symbol UTF-8/16 Length Extractor Circuit 1500a (an embodiment of N-Symbol UTF-8/16 Length Extractor Circuit 1500 with N=4). 4-Symbol UTF-8/16 Length Extractor Circuit 1500a includes 2N=8 Length Decoder Circuits $LD_0$, $LD_1$, $LD_2$, . . . , $LD_7$, which receive corresponding input data words $W_0$, $W_1$, $W_2$, . . . , $W_7$, respectively, and generate pairs of encoded byte length values $L_{00}$ and $L_{01}$, $L_{10}$ and $L_{11}$, $L_{20}$ and $L_{21}$, . . . , $L_{70}$ and $L_{71}$, respectively.

Symbol byte lengths for N=4 encoded symbols may be obtained by filtering (e.g., using example hardware skip filter 1200 of FIG. 12A) the S byte length values from the stream of byte length values determined by Length Decoder Circuits $LD_0$, $LD_1$, $LD_2$, . . . , $LD_7$. The first 4 filtered byte length values constitute the symbol byte lengths for the first 4 symbols in the input stream.

As described above, N-symbol UTF-8/16 Length Extractor Circuit 1500 may be used to determine byte length values of N-symbol strings of UTF-8 or UTF-16 encoded symbols. Because N-symbol strings may occur anywhere in an input data stream, to determine byte length values for each N-symbol string of input data, the inputs to N-symbol UTF-8/16 Length Extractor Circuit 1500 may be shifted by one byte for each N-symbol string. If the input data rate is R bytes per second, N-symbol UTF-8/16 Length Extractor Circuit 1500 would need to operate at the same data rate: R bytes per second. In some systems, such as computational storage, data rate R can be quite high (e.g., 50 GB/second). Operating N-symbol UTF-8/16 Length Extractor Circuit 1500 at such high rates may be quite challenging.

One way to reduce the data rate required of N-symbol UTF-8/16 Length Extractor Circuit 1500 is to implement multiple instances of N-symbol UTF-8/16 Length Extractor Circuit 1500 in parallel, offset by one byte of input data. Because each UTF-8 and UTF-16 symbol may include 4 bytes, 4N instances of N-symbol UTF-8/16 Length Extractor Circuit 1500 may be operated in parallel, each offset by one byte of input data. As a result, if the input data rate is R bytes per second, each N-symbol UTF-8/16 Length Extractor Circuit 1500 may operate at R/4N Hz, which may significantly ease the bandwidth requirements of N-symbol UTF-8/16 Length Extractor Circuits 1500.

Figure 16:
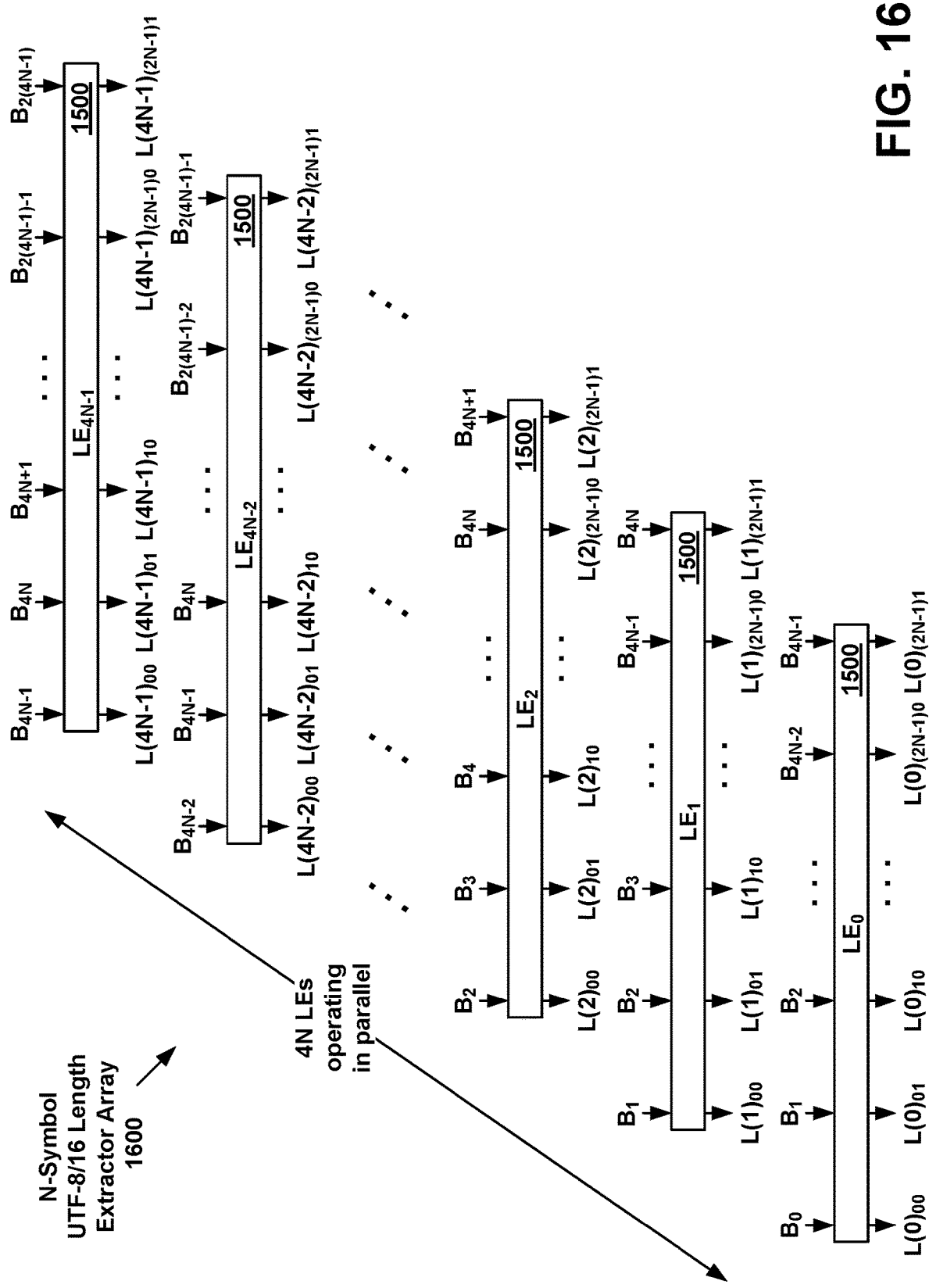
FIG. 16 is a diagram of an embodiment of a hardware circuit for determining byte length values of 4N consecutive N-symbol strings of UTF-8 or UTF-16 encoded symbols.

For example, FIG. 16 is a diagram of an embodiment of a hardware circuit (N-Symbol UTF-8/16 Length Extractor Array 1600) for determining byte length values of 4N consecutive N-symbol strings of UTF-8 or UTF-16 encoded symbols. In an embodiment, N-Symbol UTF-8/16 Length Extractor Array 1600 may be implemented on one or more memory die 106 (FIG. 1), controller 104 (FIG. 1), or a combination thereof. In an embodiment, N-Symbol UTF-8/16 Length Extractor Array 1600 may be implemented in regular expression filter circuits 222 (FIG. 2). In other embodiments, N-Symbol UTF-8/16 Length Extractor Array 1600 may be implemented in other hardware circuits included in or coupled to memory system 100 (FIG. 1).

N-Symbol UTF-8/16 Length Extractor Array 1600 includes 4N UTF-8/16 Length Extractor Circuits $LE_0$, $LE_1$, $LE_2$, . . . , $LE_{4N-1}$, each an instance of N-Symbol UTF-8/16 Length Extractor Circuit 1500 of FIG. 15A, and each offset by one byte of input data. For example, N-Symbol UTF-8/16 Length Extractor Circuit $LE_0$ receives 4N input bytes $B_0$, $B_1$, $B_2$, . . . , $B_{4N-2}$, $B_{4N-1}$ and generates 2N pairs of encoded byte length values $L(0)_{00}$ and $L(0)_{11}$, $L(0)_{00}$ and $L(0)_{11}$, . . . , $L(0)_{(2N-1)0}$ and $L(0)_{(2N-1)1}$, N-Symbol UTF-8/16 Length Extractor Circuit $LE_1$ receives 4N input bytes $B_1$, $B_2$, $B_3$, . . . , $B_{4N-1}$, $B_{4N}$ and generates 2N pairs of encoded byte length values $L(1)_{00}$ and $L(1)_{11}$, $L(1)_{00}$ and $L(1)_{11}$, . . . , $L(1)_{(2N-1)0}$ and $L(1)_{(2N-1)1}$, and so on. Thus, N-Symbol UTF-8/16 Length Extractor Array 1600 determines byte length values of 4N consecutive N-symbol strings of UTF-8 or UTF-16 encoded symbols.

Figure 17:
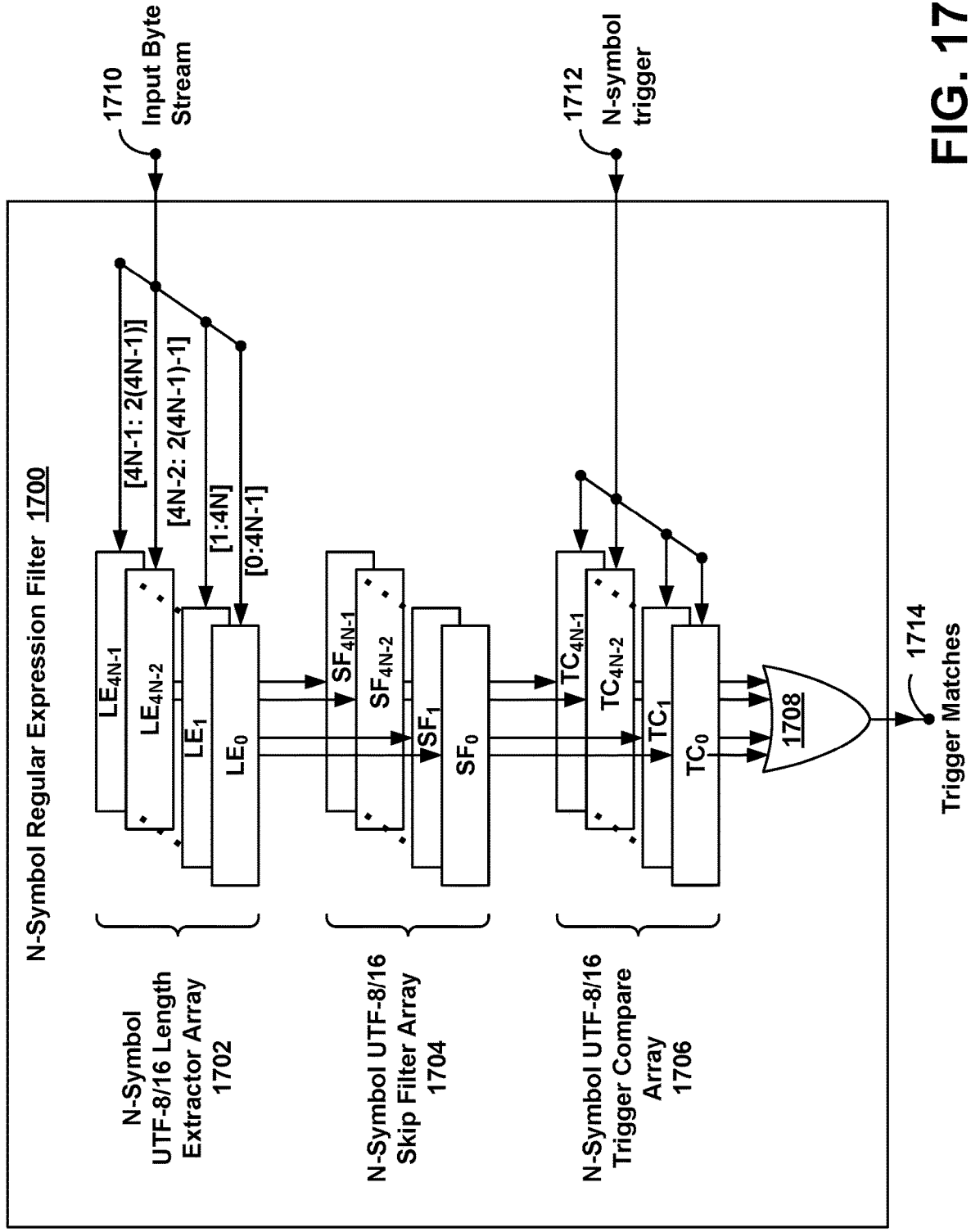
FIG. 17 is a diagram of an embodiment of a hardware circuit for determining byte length values of 4N consecutive N-symbol strings of UTF-8 or UTF-16 encoded symbols.

FIG. 17 is a diagram of an embodiment of a hardware circuit (N-Symbol Regular Expression Filter 1700) for determining byte length values of 4N consecutive N-symbol strings of UTF-8 or UTF-16 encoded symbols. In an embodiment, N-Symbol Regular Expression Filter 1700 may be implemented on one or more memory die 106 (FIG. 1), controller 104 (FIG. 1), or a combination thereof. In an embodiment, N-Symbol Regular Expression Filter 1700 may be implemented in regular expression filter circuits 222 (FIG. 2). In other embodiments, N-Symbol Regular Expression Filter 1700 may be implemented in other hardware circuits included in or coupled to memory system 100 (FIG. 1).

In an embodiment, N-Symbol Regular Expression Filter 1700 includes an N-Symbol UTF-8/16 Length Extractor Array 1702, an N-Symbol Skip Filter Array 1704, an N-Symbol Trigger Compare Array 1706, and an OR gate 1708. In an embodiment, N-Symbol Regular Expression Filter 1700 receives input data from an input stream at a first input terminal 1710, receives symbol byte lengths of an N-symbol trigger at a second input terminal 1712, and provides trigger match indications at an output terminal 1714.

In an embodiment, N-Symbol UTF-8/16 Length Extractor Array 1702 may be implemented using N-Symbol UTF-8/16 Length Extractor Array 1600 of FIG. 16. N-Symbol UTF-8/16 Length Extractor Array 1702 includes 4N 4N UTF-8/16 Length Extractor Circuits $LE_0$, $LE_1$, $LE_2$, . . . , $LE_{4N-1}$, each an instance of N-Symbol UTF-8/16 Length Extractor Circuit 1500 of FIG. 15A, each coupled to first input terminal 1710, and each offset by one byte of input data.

For example, N-Symbol UTF-8/16 Length Extractor Circuit $LE_0$ receives 4N input bytes (0:4N-1) at first input terminal 1710, N-Symbol UTF-8/16 Length Extractor Circuit $LE_1$ receives 4N input bytes (1:4N) at first input terminal 1710, . . . , N-Symbol UTF-8/16 Length Extractor Circuit $LE_{4N-2}$ receives 4N input bytes (4N-2:2(4N-1)-1) at first input terminal 1710, and N-Symbol UTF-8/16 Length Extractor Circuit $LE_{4N-1}$ receives 4N input bytes (4N-1:2(4N-1)) at first input terminal 1710.

In an embodiment, each N-Symbol UTF-8/16 Length Extractor Circuit $LE_0$, $LE_1$, . . . , $LE_{N-2}$, $LE_{N-1}$ generates 2N pairs of encoded byte length values, such as described above regarding N-Symbol UTF-8/16 Length Extractor Array 1600 of FIG. 16. To avoid overcrowding the drawing, a single output arrow is shown for each of N-Symbol UTF-8/16 Length Extractor Circuits $LE_0$, $LE_1$, . . . , $LE_{4N-2}$, $LE_{4N-1}$. Each output arrow represents the 2N pairs of encoded byte length values generated by the corresponding length extractor circuit.

The pairs of encoded byte length values generated by N-Symbol UTF-8/16 Length Extractor Array 1702 are provided as inputs to N-Symbol Skip Filter Array 1704. In an embodiment, N-Symbol Skip Filter Array 1704 includes 4N skip filters $SF_0$, $SF_1$, . . . $SF_{4N-2}$, $SF_{4N-1}$, each an instance of hardware skip filter 1200 of FIG. 12A, modified to include 2 associated byte length values per word. In an embodiment, each skip filter $SF_0$, $SF_1$, . . . , $SF_{4N-2}$, $SF_{4N-1}$ receives 2N pairs of encoded byte length values from N-Symbol UTF-8/16 Length Extractor Circuits $LE_0$, $LE_1$, . . . , $LE_{4N-2}$, $LE_{4N-1}$, respectively, and filters S byte length values from the received byte length values. The first N filtered byte length values for each skip filter $SF_0$, $SF_1, \ldots, SF_{4N-2}, SF_{4N-1}$ constitutes the symbol byte lengths for N symbols in the associated N-symbol string of UTF-8 or UTF-16 encoded symbols. Thus, N-Symbol Skip Filter Array 1704 outputs symbol byte lengths for N symbols in 4N consecutive N-symbol strings of UTF-8 or UTF-16 encoded symbols.

In an embodiment, the N symbol byte lengths output from each skip filter $SF_0, SF_1, \ldots, SF_{4N-2}, SF_{4N-1}$ are provided as inputs to N-Symbol Trigger Compare Array 1706. In an embodiment, N-Symbol Trigger Compare Array 1706 includes 4N trigger compare circuits $TC_0, TC_1, \ldots, TC_{4N-2}, TC_{4N-1}$, each coupled to receive N symbol byte lengths from corresponding skip filters $SF_0, SF_1, \ldots, SF_{4N-2}, SF_{4N-1}$, respectively, and each coupled to second input terminal 1712 to receive symbol byte lengths for an N-symbol trigger (referred to herein as "trigger symbol byte lengths.")

In an embodiment, each trigger compare circuit $TC_0, TC_1, \ldots, TC_{4N-2}, TC_{4N-1}$ includes circuits (e.g., logic gates) to compare N symbol byte lengths from corresponding skip filters $SF_0, SF_1, \ldots, SF_{4N-2}, SF_{4N-1}$ with the trigger symbol byte lengths. In an embodiment, if a trigger compare circuit $TC_0, TC_1, \ldots, TC_{4N-2}, TC_{4N-1}$ detects a match the trigger compare circuit generates a first 1-bit output value (e.g., 1). Conversely, a trigger compare circuit $TC_0, TC_1, \ldots, TC_{4N-2}, TC_{4N-1}$ does not detect a match the trigger compare circuit generates a second 1-bit output value (e.g., 0). Thus, N-Symbol Trigger Compare Array 1706 output match/no match indications for 4N consecutive N-symbol strings of UTF-8 or UTF-16 encoded symbols.

In an embodiment, OR gate 1708 receives the 1-bit outputs of trigger compare circuits $TC_0, TC_1, \ldots, TC_{4N-2}, TC_{4N-1}$ and provides at output terminal 1714 a 1-bit output value indicating whether there is a symbol byte length match in any of the 4N consecutive N-symbol strings of UTF-8 or UTF-16 encoded symbols.

A person of ordinary skill in the art will understand that the outputs of the trigger compare circuits TC(0) to TC(4N−1) can be used to determine at which byte(s) in the first 4N bytes of the input stream a matched set of N-symbols begin. In addition, a person of ordinary skill in the art will understand that the 4N consecutive bytes in a N symbol trigger is a worst case assumption. For triggers using a mix of symbols all of which are not 4 bytes per symbol, a larger than N symbol trigger can be applied up to 4N for triggers that only consist of UTF-8 1 byte symbols.

In an embodiment, if the output of N-Symbol Regular Expression Filter 1700 is 0, the 4N consecutive N-symbol strings of UTF-8 or UTF-16 encoded symbols cannot match the regular expression, and thus bytes (0: 4N) need not be transferred between the memory device (e.g., memory system 100 of FIG. 1) and a host device (e.g., host 102 of FIG. 1) for regular expression matching.

In an embodiment, if the output of N-Symbol Regular Expression Filter 1700 is 1, one or more of the 4N consecutive N-symbol strings of UTF-8 or UTF-16 encoded symbols match the regular expression, and thus one or more of bytes (0:4N) may be transferred between the memory device (e.g., memory system 100 of FIG. 1) and a host device (e.g., host 102 of FIG. 1) for regular expression matching.

Without wanting to be bound by any particular theory, it is believed that the described hardware regular expression filters, such as N-Symbol Regular Expression Filter 1700 may reduce the amount of data transferred from the memory device to the host device for regular expression matching.

Without wanting to be bound by any particular theory, it is believed that the described hardware regular expression filters, such as N-Symbol Regular Expression Filter 1700 may be feasibly implemented circuits because the described hardware regular expression filters identify matching strings without identifying symbols in the strings or symbols in the trigger.

Without wanting to be bound by any particular theory, it is believed that the described hardware regular expression filters, such as N-Symbol Regular Expression Filter 1700 may be feasibly implemented circuits because the described hardware regular expression filters identify matching strings without comparing actual symbols in the strings to actual symbols in the trigger.

One embodiment includes an apparatus that includes a memory system that has a memory die that includes a circuit configured to receive at a first input terminal a plurality of bytes comprising an input stream of a first plurality of variable-length encoded symbols, and determine a sequence of symbol byte lengths for each of the first plurality of variable-length encoded symbols.

One embodiment includes an apparatus that includes a memory system that includes a memory die and a regular expression filter circuit. The regular expression filter circuit is configured to identify strings in a stream of data read from the memory die that match a trigger comprising a plurality of variable-length encoded symbols. The strings comprise a plurality of variable-length encoded symbols.

One embodiment includes a regular expression filter circuit that includes a first length decoder circuit and a second length decoder circuit. The first length decoder circuit is coupled to receive a first byte of data and a second byte of data at an input terminal, and is configured to determine a symbol byte length for the first byte of data. The second length decoder circuit is coupled to receive the first byte of data and the second byte of data at the input terminal, and is configured to determine a symbol byte length for the second byte of data. The first byte of data and the second byte of data include variable-length encoded symbols.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

The invention claimed is:

1. An apparatus comprising:
a memory system comprising:
a non-volatile memory; and
a hardware circuit comprising a first input terminal and a second input terminal, the hardware circuit coupled to the non-volatile memory and configured to:
receive from the non-volatile memory at the first input terminal a plurality of bytes comprising an input stream of a first plurality of variable-length encoded symbols;
determine a sequence of symbol byte lengths for each of the first plurality of variable-length encoded symbols;
receive at the second input terminal a sequence of symbol byte lengths for each of a second plurality of variable-length encoded symbols; and
determine if the sequence of symbol byte lengths of the first plurality of variable-length encoded symbols matches the sequence of symbol byte lengths of the second plurality of variable-length encoded symbols,
wherein based on the determined match results the memory system is configured to reduce an amount of data transferred from the non-volatile memory to a host device.

2. The apparatus of claim 1, wherein the hardware circuit is further configured to:
receive at the second input terminal a sequence of N symbol byte lengths for each of N variable-length encoded symbols; and
determine if any sequence of N symbol byte lengths of the first plurality of variable-length encoded symbols matches the sequence of N symbol byte lengths of the N variable-length encoded symbols.

3. The apparatus of claim 1, wherein
the memory system is configured to selectively transfer the input stream to the host device based on the determined match results.

4. The apparatus of claim 1, wherein
the hardware circuit is further configured to make the match determination without identifying actual symbols in the first plurality of variable-length encoded symbols or identifying actual symbols in the second plurality of variable-length encoded symbols.

5. The apparatus of claim 1, wherein the hardware circuit comprises a regular expression filter.

6. The apparatus of claim 1, wherein the plurality of second variable-length encoded symbols comprise a trigger of a regular expression filter.

7. The apparatus of claim 1, wherein the first variable-length encoded symbols comprise a Unicode Transformation Format encoding scheme.

8. The apparatus of claim 7, wherein the Unicode Transformation Format encoding scheme comprises any of a UTF-8 encoding scheme and a UTF-16 encoding scheme.

9. The apparatus of claim 1, wherein the input stream comprises a stream of data read from the non-volatile system.

10. An apparatus comprising:
a memory system comprising:
a memory die; and
a hardware regular expression filter circuit configured to:
identify strings in a stream of data read from the memory die that match a trigger comprising a plurality of variable-length encoded symbols; and
identify matching strings without identifying actual symbols in the strings or actual symbols in the trigger,
wherein the strings comprise a plurality of variable-length encoded symbols; and
wherein based on the identified matching strings the memory system is configured to reduce an amount of data transferred from the memory die to a host device.

11. The apparatus of claim 10, wherein the regular expression filter circuit is configured to identify matching strings without comparing actual symbols in the strings to actual symbols in the trigger.

12. The apparatus of claim 10, wherein the stream of data is read from the memory die at a first rate, and the regular expression filter circuit is configured to operate at a second rate lower than the first rate.

13. The apparatus of claim 10, wherein
the memory system is further configured to transfer the identified matching strings to the host device.

14. The apparatus of claim 10, wherein the strings comprise a plurality of symbols encoded using Unicode Transformation Format encoding scheme.

15. The apparatus of claim 14, wherein the Unicode Transformation Format encoding scheme comprises any of a UTF-8 encoding scheme and a UTF-16 encoding scheme.

16. A computer memory system comprising:
a non-volatile memory; and
a hardware regular expression filter circuit coupled to the non-volatile memory, the hardware regular expression filter circuit comprising:
a first length decoder circuit configured to receive a first byte of data and a second byte of data from the non-volatile memory at an input terminal, and configured to determine a symbol byte length for the first byte of data; and
a second length decoder circuit configured to receive the first byte of data and the second byte of data from the non-volatile memory at the input terminal, and configured to determine a symbol byte length for the second byte of data,
wherein the first byte of data and the second byte of data comprise variable-length encoded symbols and
when based on the determined symbol byte lengths the computer memory system is configured to reduce an amount of data transferred from the non-volatile memory to a host device.

17. The computer memory system of claim 16, wherein the first byte of data and the second byte of data comprise Unicode Transformation Format encoded symbols.

18. The computer memory system of claim 16, wherein the first byte of data and the second byte of data comprise UTF-8 or UTF-16 encoded symbols.

* * * * *